(12) United States Patent
Surineni et al.

(10) Patent No.: US 8,305,948 B2
(45) Date of Patent: Nov. 6, 2012

(54) TRANSMISSIONS TO MULTIPLE STATIONS IN WIRELESS COMMUNICATION SYSTEMS

(75) Inventors: Shravan K. Surineni, Waltham, MA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 815 days.

(21) Appl. No.: 11/939,379

(22) Filed: Nov. 13, 2007

(65) Prior Publication Data

US 2008/0112351 A1 May 15, 2008

Related U.S. Application Data

(60) Provisional application No. 60/866,038, filed on Nov. 15, 2006.

(51) Int. Cl.
*H04H 20/71* (2008.01)
(52) U.S. Cl. .................. 370/312; 370/310; 370/432
(58) Field of Classification Search .......... 370/311, 370/312, 338, 334, 389, 278, 252; 455/562.1, 455/63.4, 73, 550.1, 561, 403, 422.1
See application file for complete search history.

(56) References Cited

U.S. PATENT DOCUMENTS

| | | | |
|---|---|---|---|
| 5,235,593 A | | 8/1993 | Grow et al. |
| 6,590,928 B1 | | 7/2003 | Haartsen |
| 2002/0045435 A1 | * | 4/2002 | Fantaske ............... 455/403 |
| 2002/0163933 A1 | * | 11/2002 | Benveniste ............ 370/465 |
| 2003/0064752 A1 | | 4/2003 | Adachi et al. |
| 2003/0123405 A1 | * | 7/2003 | del Prado et al. ........ 370/331 |
| 2004/0196819 A1 | * | 10/2004 | Lin et al. .............. 370/338 |

(Continued)

FOREIGN PATENT DOCUMENTS

RU 2201034 C2 3/2003
(Continued)

OTHER PUBLICATIONS

IEEE 802 11 Working Group: "IEEE P802 11e/D13.0: IEEE Standard for Information technology—Telecommunications and Information exchange between systems—Local and metropolitan area networks-Specific requirements Part 11: Wireless LAN Medium Access Control (MAC) and Physical Layer (PHY) specifications: MAC QoS enhancements" Internet Citation, [Online] Jan. 2005, XP002423649, Retrieved from the Internet: URL: http://standards.1eee.org/reading/ieee/std/1anman/drafts/P802.lie.pdf> [retrieved on Mar. 6, 2007].

(Continued)

*Primary Examiner* — Hassan Phillips
*Assistant Examiner* — Anez Ebrahim
(74) *Attorney, Agent, or Firm* — Qualcomm Patent Group; James Hunt Yancey, Jr.

(57) ABSTRACT

Systems and methodologies are described that facilitate coordinating and conducting transmissions to multiple stations in a wireless communication system during a single transmission opportunity. A holder of a transmission opportunity can communicate a request-to-send message or a self-addressed clear-to-send message to one or more stations to establish the transmission opportunity. Subsequently, data transmissions with respective stations can be initiated by transmitting request-to-send messages to the respective stations. At each receiving station, the source address of a received request-to-send message is compared to the address of the holder of the transmission opportunity. If the addresses match for a given request-to-send message, the receiving station transmits a clear-to-send message to the holder of the transmission opportunity in response to the request-to-send message.

42 Claims, 15 Drawing Sheets

U.S. PATENT DOCUMENTS

| | | | | |
|---|---|---|---|---|
| 2004/0242252 | A1* | 12/2004 | Hoeben | 455/503 |
| 2005/0002364 | A1* | 1/2005 | Ozer et al. | 370/338 |
| 2005/0027878 | A1* | 2/2005 | Sin et al. | 709/237 |
| 2005/0136990 | A1 | 6/2005 | Hardacker et al. | |
| 2005/0141459 | A1 | 6/2005 | Li et al. | |
| 2005/0141545 | A1* | 6/2005 | Fein et al. | 370/445 |
| 2005/0285803 | A1 | 12/2005 | Iacono et al. | |
| 2006/0007862 | A1 | 1/2006 | Sayeedi et al. | |
| 2006/0120334 | A1* | 6/2006 | Wang et al. | 370/338 |
| 2006/0194616 | A1 | 8/2006 | Willins et al. | |
| 2006/0221999 | A1 | 10/2006 | Bachrach et al. | |
| 2007/0037548 | A1* | 2/2007 | Sammour et al. | 455/343.2 |
| 2007/0037600 | A1 | 2/2007 | Fukuda | |

FOREIGN PATENT DOCUMENTS

| | | |
|---|---|---|
| WO | WO2004064330 | 7/2004 |
| WO | WO2005039133 A1 | 4/2005 |
| WO | WO2006101916 | 9/2006 |
| WO | WO2007081683 A2 | 7/2007 |

OTHER PUBLICATIONS

International Search Report—PCT/US2007/084863, International Search Authority—European Patent Office—Apr. 23, 2008.

Stephens, et al.: "Joint Proposal: High throughput extension to the 802.11 Standard: MAC" IEEE 802.11-05/1095R5, [Online] XP002476114, pages 1-104, Jan. 13, 2006.

Written Opinion—PCT/US2007/084863, International Seach Authority—European Patent Office—Apr. 23, 2008.

"Medium Access Control (MAC) and Physical (PHY) Specifications", Sections 7.2.1.1 to 7.2.1.2, IEEE Std 802.11 1999 Edition.

Taiwan Search Report—TW096143337-TIPO—Jul. 29, 2011.

First Office Action, Patent Application No. 2009-537373, dated Jun. 26, 2012, citing U.S. Patent Application Publication No. 2005/0285803, International Publication No. 2007/081683, 3 pages.

* cited by examiner

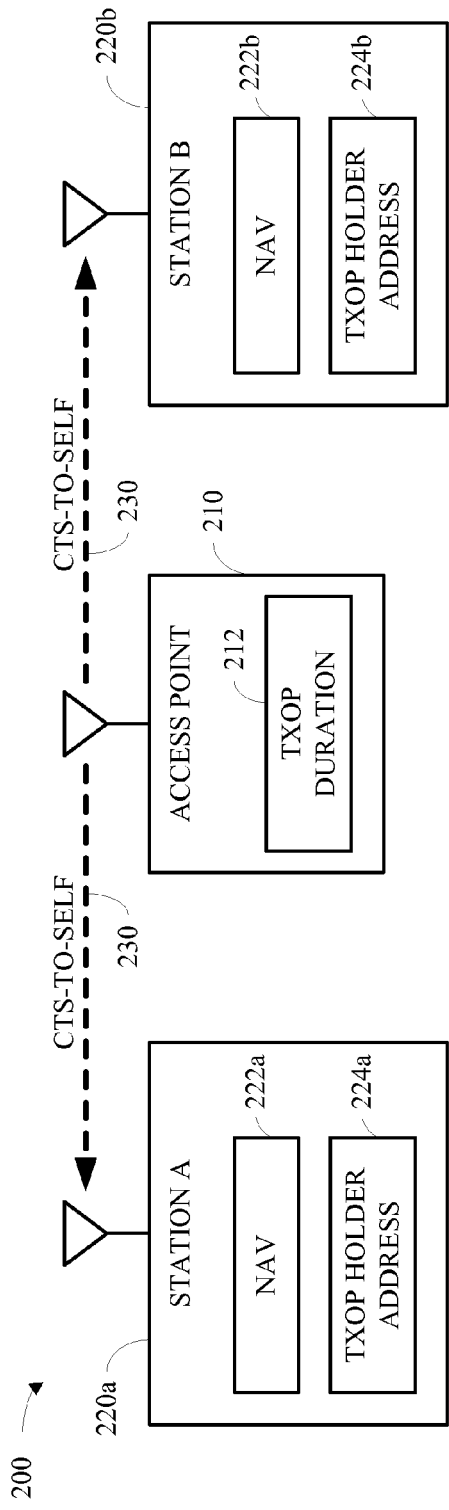
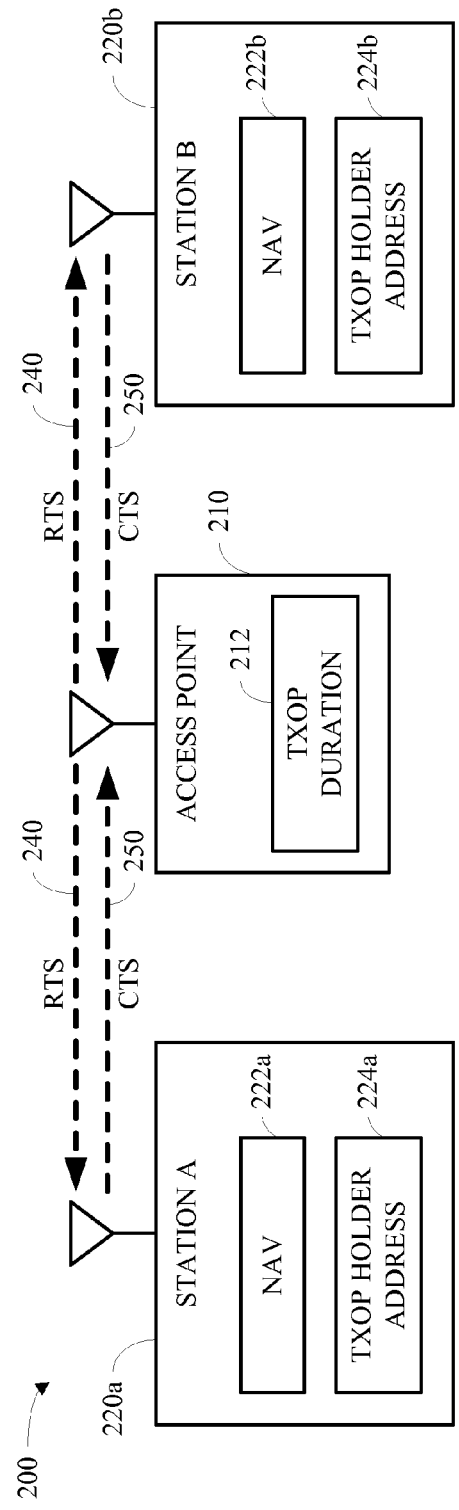
FIG. 2A
FIG. 2B

TRANSMISSIONS TO MULTIPLE STATIONS IN WIRELESS COMMUNICATION SYSTEMS

CROSS-REFERENCE

This application claims the benefit of U.S. Provisional Application Ser. No. 60/866,038, filed Nov. 15, 2006, and entitled "TRANSMISSIONS TO MULTIPLE STATIONS IN WIRELESS COMMUNICATION SYSTEMS," the entirety of which is incorporated herein by reference.

BACKGROUND

I. Field

The present disclosure relates generally to wireless communications, and more specifically to techniques for initializing and conducting transmissions to multiple devices in a wireless communication system.

II. Background

Wireless communication systems, such as Wireless Local Area Network (WLAN) systems, are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Devices in a WLAN system can access channels for communication using a variety of channel access modes. These include controlled channel access modes, such as Hybrid Coordination Function (HCF) Controlled Channel Access (HCCA), and contention-based channel access modes, such as Enhanced Distributed Channel Access (EDCA). By accessing a channel, a device can establish a transmission opportunity (TXOP) for communicating with other devices using the channel. Network efficiency can be improved by allowing transmissions to multiple devices in a single TXOP established by a device. However, methods of reliable transmissions to multiple devices in a single TXOP are not provided in many wireless communication systems. Thus, there exists a need for efficient techniques for conducting transmissions to multiple devices in a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for coordinating and conducting transmissions to a plurality of users during a transmission opportunity is described herein. The method can comprise transmitting a frame to one or more users selected from the group consisting of a clear-to-send frame and a request-to-send frame, the frame establishes a transmitter as a holder of a transmission opportunity and comprises an address of the transmitter and a transmission interval; transmitting a request-to-send frame to a first user during the transmission interval, the request-to-send frame indicates the address of the transmitter and an address of the first user; receiving a clear-to-send frame from the first user responsive to the request-to-send frame; transmitting data to the first user; transmitting a request-to-send frame to a second user during the transmission interval, the request-to-send frame indicates the address of the transmitter and an address of the second user; receiving a clear-to-send frame from the second user responsive to the request-to-send frame; and transmitting data to the second user.

Another aspect relates to a wireless communications apparatus that can comprise a memory that stores data relating to an address of the wireless communications apparatus and a transmission opportunity (TXOP) duration. The wireless communications apparatus can further comprise a processor configured to transmit at least one of a clear-to-send message or a request-to-send message to one or more stations, the at least one message comprises the address of the wireless communications apparatus; transmit respective request-to-send messages indicating the address of the wireless communication apparatus to respective stations; receive respective clear-to-send messages from the respective stations; and transmit data to the respective stations.

Yet another aspect relates to an apparatus that facilitates assigning a plurality of users for communication during a transmission interval. The apparatus can comprise means for transmitting one or more of a clear-to-send message and a request-to-send message to one or more stations that includes a transmitter address, a receiver address, and a length of the transmission interval; means for transmitting request-to-send messages to respective stations for which data is to be transmitted; and means for receiving clear-to-send messages from the respective stations in response to the request-to-send messages.

Still another aspect relates to a computer-readable medium, which can comprise code for causing a computer to identify a communication interval; code for causing a computer to transmit a message to one or more users in a plurality of users to establish a transmission opportunity for communication with the plurality of users during the communication interval; code for causing a computer to communicate a request message to a first user in the plurality of users during the communication interval; code for causing a computer to receive a response message from the first user; code for causing a computer to communicate a request message to a second user in the plurality of users during the communication interval; and code for causing a computer to receive a response message from the second user.

According to another aspect, an integrated circuit is described herein that can execute computer-executable instructions for transmitting to multiple stations during a transmission period. The instructions can comprise establishing a transmission opportunity at least in part by transmitting a message to one or more stations in the plurality of stations that specifies a transmitter address and a length of the transmission period; transmitting request-to-send messages to respective stations in the plurality of stations; receiving clear-to-send messages from the respective stations in response to the request-to-send messages; and communicating data to the respective stations.

According to an additional aspect, a method for initiating and conducting communication in a wireless communication system is described herein. The method can comprise detecting one or more clear-to-send frames or request-to-send frames, the one or more frames indicate an address of an entity that holds a transmission opportunity and a duration of the transmission opportunity; setting a network allocation vector (NAV) based on the duration of the transmission opportunity; receiving a request-to-send frame that indicates an address of an entity that transmitted the request-to-send frame; determining if the address of the entity that transmitted the request-to-send frame is the same as the address of the entity that holds the transmission opportunity; and if the addresses are the same, transmitting a clear-to-send frame to the entity that transmitted the request-to-send frame.

Another aspect relates to a wireless communications apparatus that can comprise a memory that stores data relating to a NAV and an address of a transmitter. The wireless communications apparatus can further comprise a processor configured to detect one or more initial messages that indicate the address of the transmitter, one or more transmission classes to be utilized by the transmitter, and transmission intervals respectively corresponding to the transmission classes; set the NAV based on the transmission intervals; receive a subsequent request-to-send message; compare a source address of the subsequent request-to-send message with the address of the transmitter; and transmit a clear-to-send message to the transmitter upon determining that the source address of the subsequent request-to-send message is the same as the address of the transmitter.

Yet another aspect relates to an apparatus that facilitates determining intervals for communication in a wireless communication system. The apparatus can comprise means for detecting one or more of a clear-to-send frame and a request-to-send frame, the one or more frames indicate a transmitter address and one or more transmission interval durations; means for receiving a request-to-send frame subsequent to the detecting one or more of a clear-to-send frame and a request-to-send frame; means for comparing an address of a station that transmitted the request-to-send frame with the transmitter address; and means for transmitting a clear-to-send frame to the station that transmitted the request-to-send frame if the address of the station that transmitted the request-to-send frame is the same as the transmitter address.

Still another aspect relates to a computer-readable medium, which can comprise code for causing a computer to detect a message that establishes a transmission opportunity; code for causing a computer to receive a request message upon establishment of the transmission opportunity; code for causing a computer to determine whether the request message was transmitted by a holder of the transmission opportunity; and code for causing a computer to transmit a response message if the request message was transmitted by the holder of the transmission opportunity.

A further aspect relates to an integrated circuit that can execute computer-executable instructions for communicating in a wireless communication system during a transmission opportunity. The instructions can comprise detecting a message transmitted to one or more stations that specifies a transmitter address and a length of a transmission period; receiving a request-to-send message during the transmission period; if an address of a station that transmitted the request to-send-message is the same as the transmitter address; transmitting a clear-to-send message in response to the request-to-send message; and receiving data from the transmitter upon transmitting the clear-to-send message.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter may be employed. Further, the disclosed aspects are intended to include all such aspects and their equivalents.

BRIEF DESCRIPTION OF THE DRAWINGS

FIGS. 2A-2C illustrate operation of an example system for communicating with multiple stations during a transmission opportunity in accordance with various aspects.

DETAILED DESCRIPTION

Figure 1:
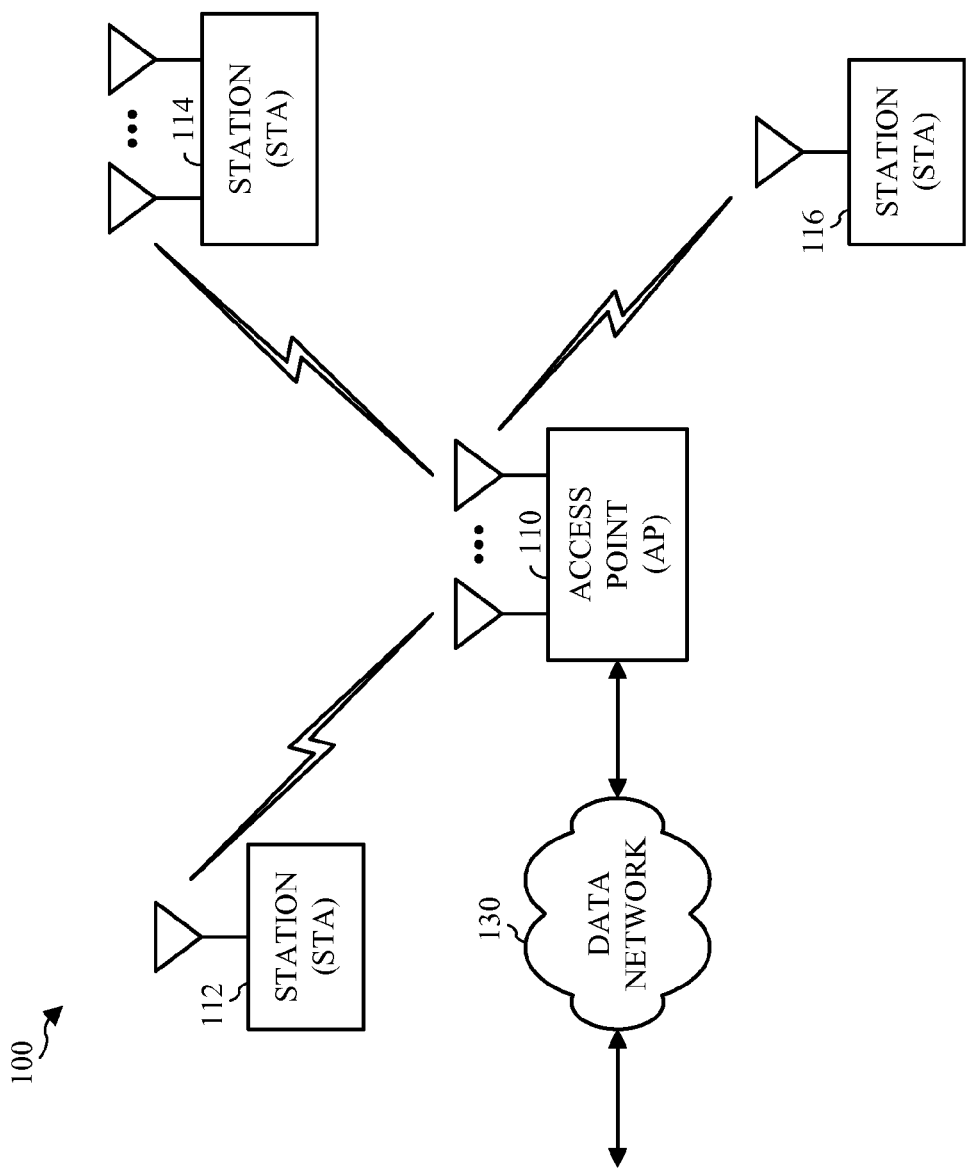
FIG. 1 illustrates a wireless communication network in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is a block diagram of a wireless communication network 100 in accordance with various aspects set forth herein. In one example, wireless network 100 includes an access point (AP) 110 and multiple stations (STAs) 112-116. While only one access point 110 and three stations 112, 114, and 116 are illustrated in network 100, it should be appreciated that wireless network 100 can include any number of access points and any number of stations. Further, it should be appreciated that access point 110 and stations 112-116 can have any number of antennas for communication in network 100.

In accordance with one aspect, a station 112-116 is a device that can communicate with one or more other stations 112-116 and/or access points 110 via a wireless medium. Stations 112-116 can be dispersed throughout network 100 and can be stationary or mobile. By way of non-limiting example, a station can also be called, and can contain some or all of the functionality of, a terminal, an access terminal, a user terminal, a mobile station, a mobile, a remote station, a user equipment (UE), a user device, a user agent, a subscriber station, a subscriber unit, and so on. Further, a station can be a cellular phone, a cordless phone, a Session Initiation Protocol (SIP) phone, a wireless local loop (WLL) station, a handheld device, a wireless device, a personal digital assistant (PDA), a laptop computer, a computing device, a wireless modem card, a media device (e.g., an HDTV, a DVD player, a wireless speaker, a camera, a camcorder, a webcam, etc.), and/or another appropriate device.

In accordance with another aspect, an access point 110 is a station that provides access to distribution services via a wireless medium for stations 112-116 associated with the access point 110. By way of specific example, an access point can also be called, and can contain some or all of the functionality of, a base station, a base transceiver subsystem (BTS), a Node B, and so on. Access point 110 can additionally couple to a data network 130 and can communicate with other devices via data network 130.

In one example, system 100 may utilize one or more multiple-access schemes, such as Carrier Sense Multiple Access (CSMA), CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally and/or alternatively, the system bandwidth can be divided into one or more frequency carriers, each of which may contain one or more subcarriers. System 100 may also utilize a combination of multiple-access schemes, such as OFDMA and CDMA.

In one example, access point 110 periodically transmits a beacon that carries a preamble, an access point identifier (AP ID), and a list of parameters for operation in a network formed by the access point. As illustrated by FIG. 1, stations 112, 114 and 116 are within the coverage of access point 110 and can detect the beacon. As a result, stations 112, 114 and 116 can perform synchronization and associate with access point 110. Thereafter, stations 112, 114 and 116 can communicate with access point 110.

In accordance with one aspect, access point 110 and/or a station 112, 114, and/or 116 can obtain resources for communicating within network 100 based on a channel access mode utilized by network 100. Channel access modes can be, for example, controlled or contention-based. By way of specific, non-limiting example, the IEEE 802.11 communication standard defines two modes of channel access. The first defined channel access mode is Enhanced Distributed Channel Access (EDCA), which is a controlled channel access mode. EDCA is an extension to the legacy Distributed Coordination Function (DCF), which works based on CSMA principles. The second defined channel access mode is Hybrid Coordination Function (HCF) Controlled Channel Access (HCCA), which is a contention-based channel access mode. EDCA can be used by both access point 110 and stations 112-116, whereas HCCA is typically exclusively used by access point 110 (referred to in HCCA as a Hybrid Coordinator).

By gaining access to a communication channel using a channel access technique, a device in network 100 can establish a transmission opportunity (TXOP) for communicating with one or more devices in network 100. Typically, network efficiency can be greatly improved in both contention-based and controlled channel access modes when a device is allowed to conduct multiple transmissions in a single TXOP. However, while methods of achieving this exist for controlled channel access modes, efficient methods do not exist for contention-based channel access. Furthermore, in a network utilizing a contention-based channel access mode such as EDCA, there has not conventionally been a mechanism by which a Request to Send/Clear to Send (RTS/CTS) exchange can be conducted with multiple stations in a TXOP. Thus, to overcome these deficiencies, access point 110 and/or stations 112-116 can utilize one or more techniques described in accordance with various aspects herein to allow multiple communications in a single TXOP established using a contention-based channel access mode.

Generally, in a network employing HCCA operation, an access point is allowed to reserve communication resources using a CF-poll (Contention Free poll) having its Recipient Address (RA) field set to match the address of the access point (i.e., a "CF-poll to self"). Once the access point transmits a CF-poll, stations that detect the CF-poll can then update their respective Network Allocation Vectors (NAVs) to a duration indicated in the CF-poll. The access point can then poll the stations and issue polled TXOPs. Typically, although the NAV of a given station is set by the CF-poll issued by the access point, stations are nonetheless allowed to respond to further RTS/CTS frames or CF-polls sent thereto. This mechanism helps the access point to reserve a TXOP large enough to service all stations for which data is to be transmitted and to use the reserved TXOP for transmission to individual stations.

Similarly, a network employing EDCA operation allows the establishment of a TXOP via a CTS-to-self or RTS/CTS frame as the first frame in a frame exchange sequence. However, in such a network, there is no conventional mechanism by which RTS/CTS frame exchanges can be used for multiple stations. Thus, in accordance with one aspect, network 100 employs a mechanism by which RTS and CTS frames can be used with multiple stations in a single EDCA TXOP. By using RTS/CTS with multiple stations, devices in network 100 can check for the presence of a station, use protection for communication between stations, request and exchange sounding and/or rate feedback, and/or perform other similar and appropriate operations.

By way of additional example, an initial RTS and/or CTS frame can be sent from an access point 110 over the 2.4 GHz ISM (Industrial, Scientific, and Medical) band using a DSSS/CCK (Direct-Sequence Spread Spectrum/Complimentary Code Keying) waveform. As a result of sending an initial RTS and/or CTS frame, the NAV of all stations served by the access point 110 can be set. Subsequent RTS/CTS frames can then be sent using an HT waveform to exchange sounding and/or rate information, to check for the presence of the intended recipient, and/or for other suitable uses. Such a transmission scheme is useful in power save cases, where the RTS and/or CTS frames provide a quick check of the current power save status of a specified station.

Figure 2C:
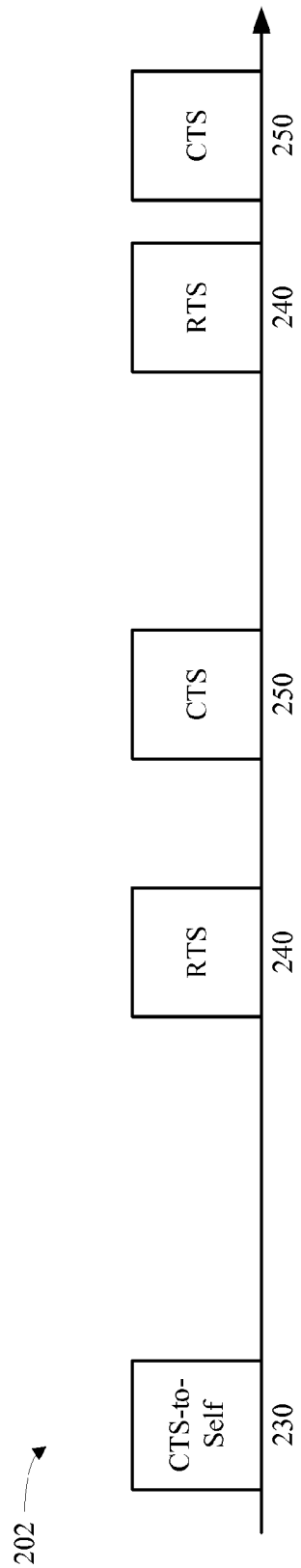

FIGS. 2A-2C illustrate operation of an example system 200 for communicating with multiple stations 220 during a transmission opportunity in accordance with various aspects described herein. As illustrated in FIGS. 2A-2B, system 200 can include an access point 210 and multiple stations 220. While one access point 210 and two stations 220 are illustrated in system 200, it should be appreciated that system 200 can include any number of access points 210 and/or stations 220. Further, access points 210 and/or stations 220 can communicate within system 200 using any number of antennas.

In accordance with one aspect, system 200 can operate using a contention-based channel access mode such as EDCA, wherein access point 210 and/or another device in system 200 obtains communication resources based on CSMA principles. To this end, by way of non-limiting example, a mechanism is illustrated in FIGS. 2A-2B by which access point 210 can establish a TXOP for multiple stations 220 and use RTS/CTS frame exchanges with multiple stations 220 served by access point 210 to communicate with each of the stations during the TXOP. As used herein and generally in the art, the set of stations 220 served by access point 210 is referred to as the base station service set (BSS) of access point 210.

In one example, access point 210 can establish a TXOP by communicating a CTS-to-self frame 230 as an initial frame in the TXOP as illustrated by FIG. 2A. A CTS-to-self frame 230 can be communicated by, for example, transmitting a CTS frame that specifies the medium access control (MAC) address of access point 210 in both the transmitter address (TA) and recipient address (RA) fields of the frame. Additionally, access point 210 can determine a desired TXOP duration 212 and communicate this information in a duration field of the CTS-to-self frame 230. In one example, access point 210 can determine a TXOP duration 212 by determining a time period that is sufficient to cover the time required to transmit any data frames pending for stations 220 in system 200 and the respective responses from the stations 220. Alternatively, access point 210 can set the TXOP duration 212 to the maximum duration allowed for a TXOP for a given access class based on which communication will be performed. Further, access point 210 can determine multiple TXOP durations 212 corresponding to respective transmission classes, each of which can be identified in the CTS-to-self frame 230.

In another example, each station 220 in the BSS of access point 210, upon receiving a CTS-to-self frame 230 from access point 210, can set its NAV 222 based on the TXOP duration 212 determined by access point 210 and embedded in the CTS-to-self frame 230. In addition, each station 220 can also obtain the MAC address of access point 210 from the RA and/or TA fields of the CTS-to-self frame 230 and save this address as a current TXOP holder address 224.

After the initial communication illustrated by FIG. 2A, access point 210 can send RTS frames 240 to individual stations 220 as illustrated by FIG. 2B. Conventionally, stations with which an access point are communicating during a TXOP are configured not to respond to RTS frames sent during the TXOP with CTS frames, as CTS frames would interrupt ongoing transmission(s) being conducted during the TXOP. However, if an access point is configured to use beamforming for transmissions to stations, the access point may require channel information feedback from stations, such as rate feedback and sounding, to efficiently construct transmissions for the stations. If the stations are configured to never respond to RTS frames during a TXOP, the access point cannot send requests for feedback in RTS frames and therefore is left with no mechanism by which feedback can be obtained. To overcome this deficiency of conventional network operation, a station 220 can respond to an RTS frame 240 sent by the holder of a TXOP as follows. In one example, when an RTS frame 240 is received by a station 220 during a TXOP, the station 220 can check the TA field of the RTS frame 240 to determine the address of the device that sent the RTS frame 240. The station 220 can then check the address of the device that sent the RTS frame 240 against the TXOP holder address 224 saved by the station 220. If the addresses do not match, the station can disregard the RTS frame 240. Alternatively, if the addresses match, the station can respond to the RTS frame 240 with a CTS frame 250 after a Short Inter Frame Spacing (SIFS) period. In one example, a CTS frame 250 is sent by a station 220 without regard for and without resetting its NAV 222.

In one example, an RTS frame 240 transmitted by access point 210 can include a request for feedback from the target station 220 of the RTS frame 240. In response, a CTS frame 250 transmitted by the target station 220 can include the desired feedback. Subsequently, access point 210 can transmit data frames for the target station 220 following the RTS/CTS exchange illustrated in FIG. 2B. Any feedback and/or other information obtained from the RTS/CTS exchange, such as sounding and rate feedback, can be used by access point 210 for this transmission. In accordance with one aspect, RTS/CTS exchanges as illustrated in FIG. 2B and data transmissions can continue as until the TXOP established by access point 210 is reset or expires. In one example, stations 220 can determine when TXOP has been reset or has expired by checking their respective NAVs 222. For example, once a NAV 222 at a station 220 is reset or counts down to 0, the station 220 can determine that the current TXOP is no longer active and can accordingly reset its TXOP holder address 224. It should be appreciated that after a TXOP expires, stations 220 will not reply to an RTS sent by an access point 210 that held the TXOP as the respective TXOP holder addresses 224 at the stations 220 have been reset.

FIG. 2C illustrates an example timeline 202 of transmissions sent and received by an access point during a TXOP as illustrated by FIGS. 2A-2B. As illustrated by timeline 202, a TXOP can begin with a CTS-to-self frame 230 sent to stations within the BSS of the access point. Next, the access point can exchange RTS frames 240 and CTS frames 250 with various stations, based on which data transmissions can be conducted with the stations.

Figure 3A:
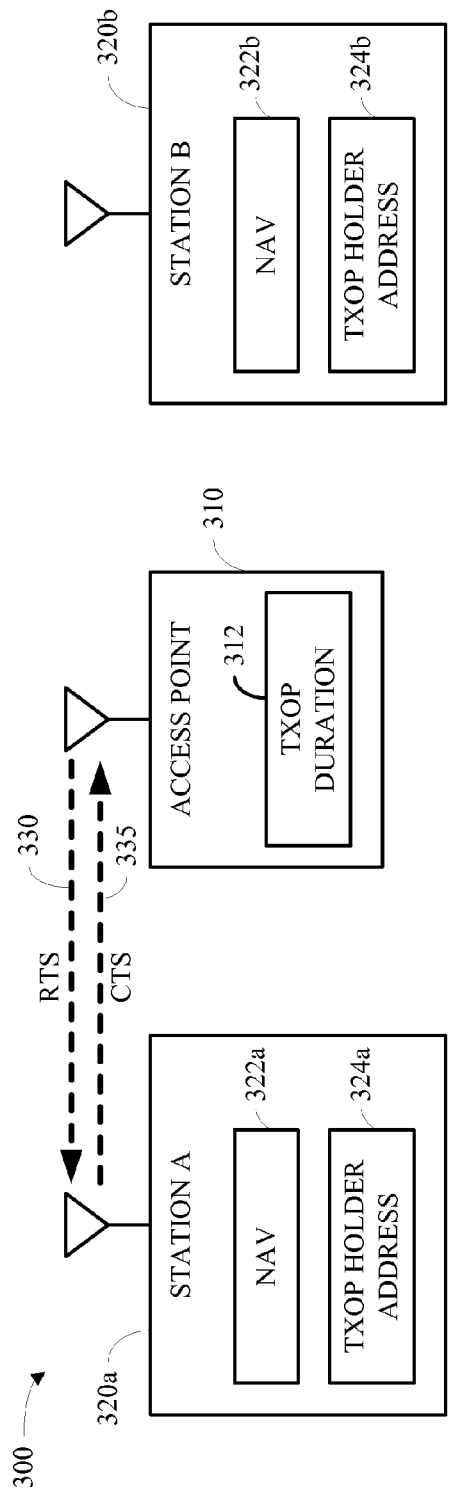
FIGS. 3A-3C illustrate operation of an example system for communicating with multiple stations during a transmission opportunity in accordance with various aspects.
Figure 3B:
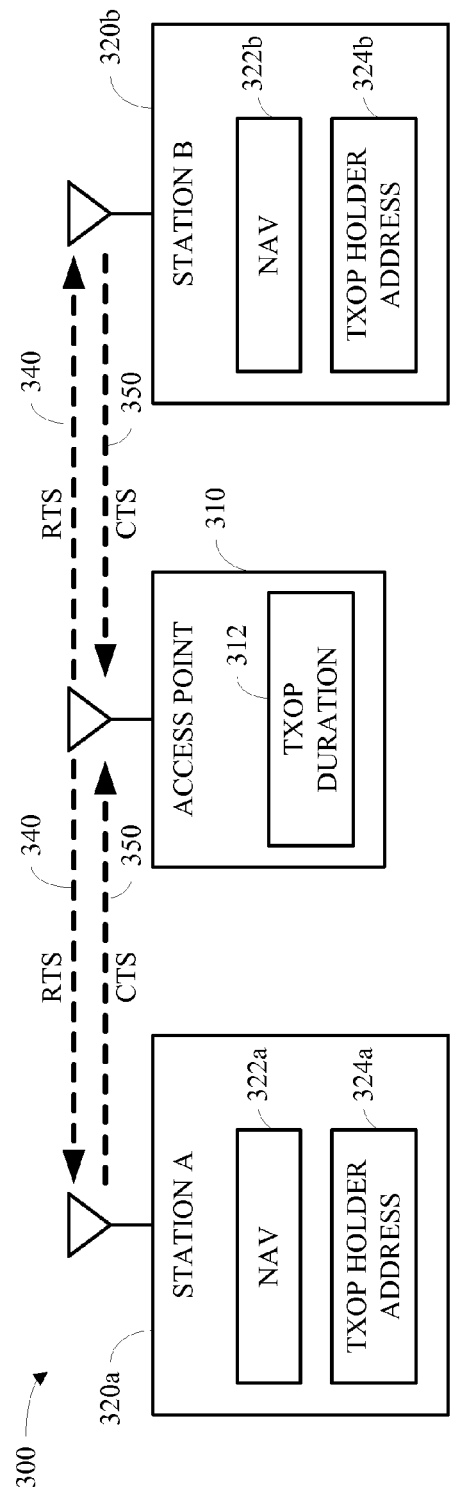
Figure 3C:
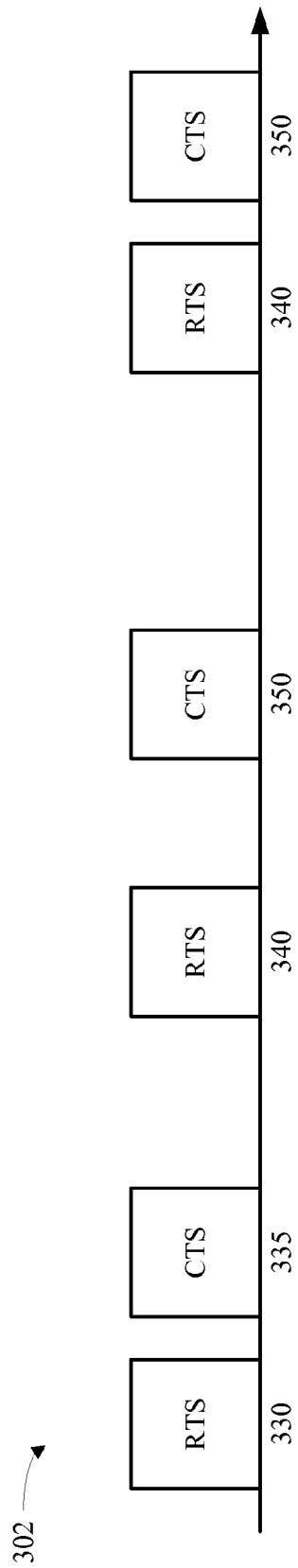

FIGS. 3A-3C illustrate operation of an alternative example system 300 for communicating with multiple stations 320 during a transmission opportunity. As illustrated in FIGS. 3A-3B, system 300 can include an access point 310 and multiple stations 320 in a similar manner to system 200. While one access point 310 and two stations 320 are illustrated in system 300, it should be appreciated that system 300 can include any number of access points 310 and/or stations 320. Further, access points 310 and/or stations 320 can communicate within system 300 using any number of antennas. System 300 can also operate using a contention-based channel access mode such as EDCA in a similar manner to system 200.

In accordance with one aspect, access point 310 can establish a TXOP by conducting an RTS/CTS exchange with one or more stations 320 as illustrated by FIG. 3A. More specifically, access point 310 can transmit an RTS frame 330 to one or more stations 320, and in response the station(s) 320 can respond with CTS frame(s) 335. It should be appreciated that the number and/or identity of stations 320 to which access point 310 transmits an initial RTS frame 330 can be determined by access point 310 in any sufficient manner. In one example, an RTS frame 330 transmitted by access point 310 and/or a CTS frame transmitted by a station 320 in response to an RTS frame 330 can convey information regarding a TXOP duration 312 for the current TXOP as determined by access point 310. Access point 310 can determine the TXOP duration 312, for example, in a similar manner to access point 210. Additionally and/or alternatively, the RTS frame 330 and/or CTS frame 335 can specify multiple transmission classes to be utilized during the TXOP, for which each can have a specified TXOP duration 312.

In one example, each station 320 in the BSS of access point 310 to which an initial RTS frame 330 is not communicated can be configured to detect initial RTS/CTS exchanges involving other stations 320 in the BSS of access point 310. Upon detecting such an exchange, a station 320 can set its NAV 322 based on a TXOP duration 312 embedded in a detected RTS frame 330 and/or CTS frame 335. In addition, each station 320 can obtain the MAC address of access point 310 from the TA field of an RTS frame 330 transmitted by access point 310 and/or the RA field of a CTS frame 335 transmitted in response to an RTS frame 330 by the station 320 to which the RTS frame 330 was directed. The MAC address of access point 310 can then be saved by a station 320 as the current TXOP holder address 324.

In accordance with one aspect, after the initialization of a TXOP using an RTS/CTS exchange with one or more stations 320 as illustrated by FIG. 3A, access point 310 can coordinate and conduct transmissions to various stations 320 in its BSS as illustrated by FIG. 3B. By way of specific example, a procedure by which access point 310 coordinates and conducts transmissions to stations 320 during a TXOP can be similar to the procedure utilized in system 200 as described with regard to FIG. 2B. For example, access point 310 can communicate an RTS frame 340 to a station 320 for which data is to be transmitted. Upon receiving the RTS frame 340, the target station 320 can check the TA field of the RTS frame 340 to determine the address of the device that sent the RTS frame 340. If this address does not match the TXOP holder address 324 saved by the station 320, the station 320 can elect not to respond to the RTS frame 340. In contrast, if the addresses are determined to match, the station 320 can respond to the RTS frame 340 with a CTS frame 350 after a SIFS time period. The CTS frame 350 can be sent by the station 320, for example, without regard for and without resetting its saved NAV 322. RTS frames 340 can additionally include requests for sounding, rate feedback, and/or other feedback or information from their respective target stations 320. Thus, CTS frames 350 communicated in response to respective RTS frames 340 can include any requested feedback and/or information. Feedback and/or information received from a CTS frame 350 from a station 320 can then be used by access point 310 during subsequent data transmissions to the station 320.

Further, in a similar manner to system 200, RTS/CTS exchanges and data transmissions in system 300 can continue as illustrated by FIG. 3B until the TXOP held by access point 310 is reset or expires. Once a station 320 determines that the current TXOP has been reset or expired, the station 320 can reset its stored TXOP holder address 324. Subsequently, the station 320 will not respond to any RTS frames 340 sent to the station 320 by access point 310.

FIG. 3C illustrates an example timeline 302 of transmissions sent and received by an access point during a TXOP as illustrated by FIGS. 3A-3B. As can be observed from timeline 302, a TXOP can be established via an initial exchange of an RTS frame 330 and a CTS frame 335 to one or more stations within the BSS of the access point. After the TXOP is established, the access point can then exchange RTS frames 340 and CTS frames 350 with various terminals in the BSS of the access point to conduct data transmissions with those stations during the established TXOP.

Figure 4:
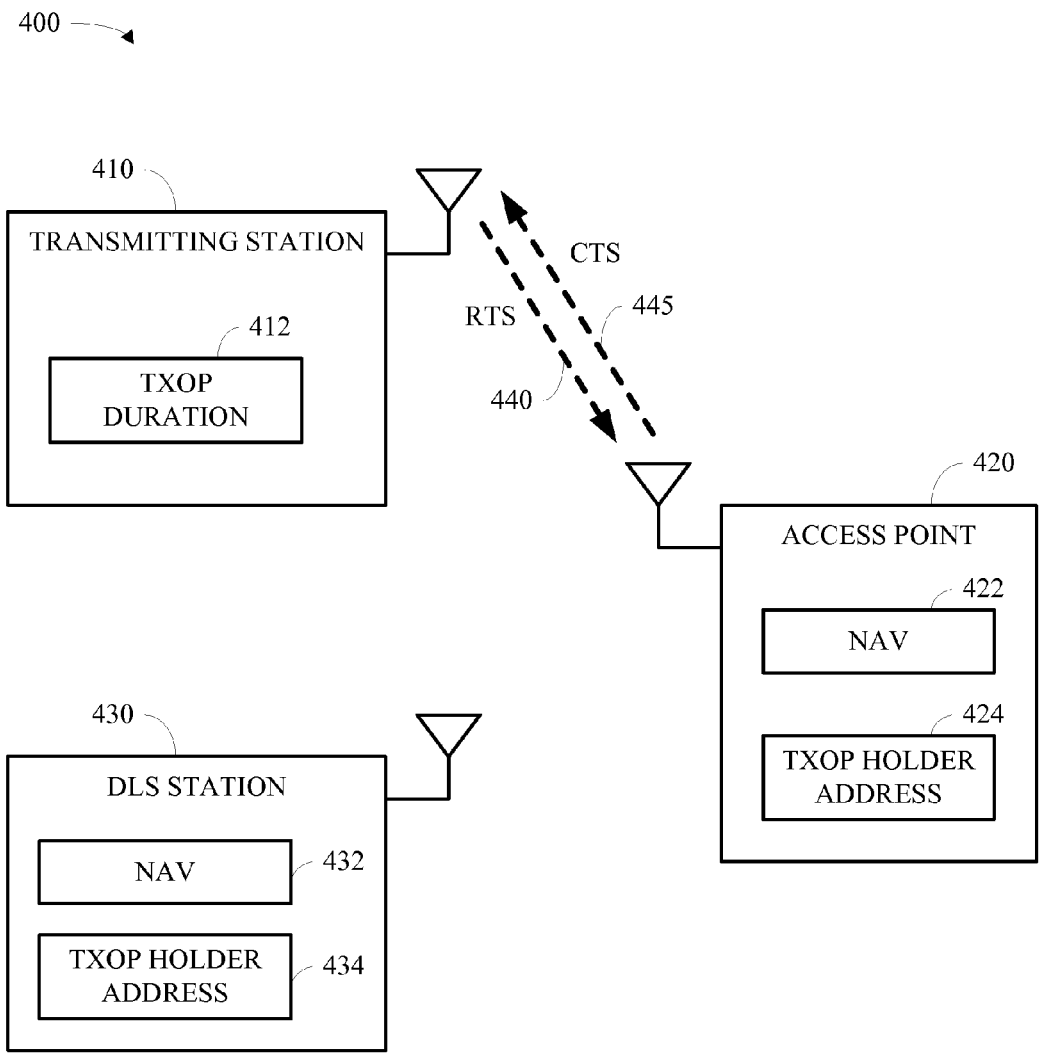
FIG. 4 illustrates an example system for communicating with an access point and one or more stations during a transmission opportunity in accordance with various aspects.

FIG. 4 is a block diagram of a system 400 for communicating with an access point 420 and one or more stations 430 during a transmission opportunity in accordance with various aspects. System 400 can include, for example, a transmitting station 410, one or more access points 420, and one or more Direct Link Setup (DLS) stations 430. While only one access point 420 and one DLS station 430 are illustrated in FIG. 4, however, it should be appreciated that system 400 can include any number of access points 420 and/or DLS stations 430.

In accordance with one aspect, a station 410 can establish a TXOP for communication with one or more access points 420 and/or DLS stations 430 using similar techniques to those illustrated by systems 200 and 300. In one example, system 400 can operate using a contention-based channel access mode such as EDCA. In such a system, a station 410 may desire to communicate data to multiple stations during a single TXOP. For example, as illustrated in system 400, transmitting station 410 may have both data for transmission to access point 420 and data for direct transmission to another station 430 via DLS and/or another suitable peer-to-peer transmission technique. In addition, transmitting station 410 may desire to transmit to both devices in a single TXOP. To the accomplishment of this end, transmitting station 410 can utilize similar mechanisms as those illustrated in systems 200 and 300 to effectively transmit to multiple stations.

As illustrated by FIG. 4, a transmitting station 410 can establish a TXOP by conducting an RTS/CTS exchange with access point 420. Alternatively, it should be appreciated that transmitting station 410 could conduct an initial RTS/CTS exchange with DLS station 430 and/or any other suitable device in system 400, either in addition to or in place of access point 420. To carry out the initial RTS/CTS exchange illustrated in system 400, transmitting station 410 can transmit an initial RTS frame 440 to access point 420 and/or one or more other stations. In response, access point 420 and/or the other stations can respond with a CTS frame 445.

In one example, an RTS frame 440 transmitted by transmitting station 410 and/or a CTS frame 445 transmitted in response by access point 420 in response to the RTS frame 440 can convey information regarding a TXOP duration 412. The TXOP duration 412 can be configured by transmitting station 410, or alternatively the TXOP duration 412 can be configured by access point 420. For example, an initial RTS frame 440 transmitted by transmitting station 410 can indicate a request for a TXOP, and access point 420 can respond to the request with a CTS frame 445 that includes a TXOP duration 412.

After the initial RTS/CTS frame exchange, access point 420 can set its NAV 422 based on the TXOP duration 412. Access point 420 can also set its TXOP holder address 424 based on the MAC address of transmitting station 410. Further, each station 430 in the BSS of access point 420 other than transmitting station 410 can be configured to detect initial RTS/CTS exchanges involving access point 420. Upon detecting such an exchange, a station 430 can also set its NAV 432 and TXOP holder address 434 in a similar manner to access point 420. It should be appreciated that, by configuring stations 430 to detect CTS frames communicated by access point 420, any potential hidden node problems can be eliminated as some stations 430 within the BSS of access point 420 may not be able to detect transmissions from transmitting station 410 despite being located within a common coverage area.

After successful TXOP initialization by transmitting station 410 as illustrated in FIG. 4, transmitting station 410 can then conduct RTS/CTS exchanges and data transmissions with individual devices in system 400 in a similar manner to that described in relation to systems 200 and 300 supra. Moreover, although not illustrated in FIG. 4, it should further be appreciated that transmitting station 410 can alternatively establish a TXOP by transmitting a CTS-to-self frame to access point 420 and/or DLS station(s) 430. Techniques by which transmitting station 410 can utilize a CTS-to-self frame for initialization of a TXOP are similar to those described with regard to FIGS. 2A-2C supra.

Figure 5:
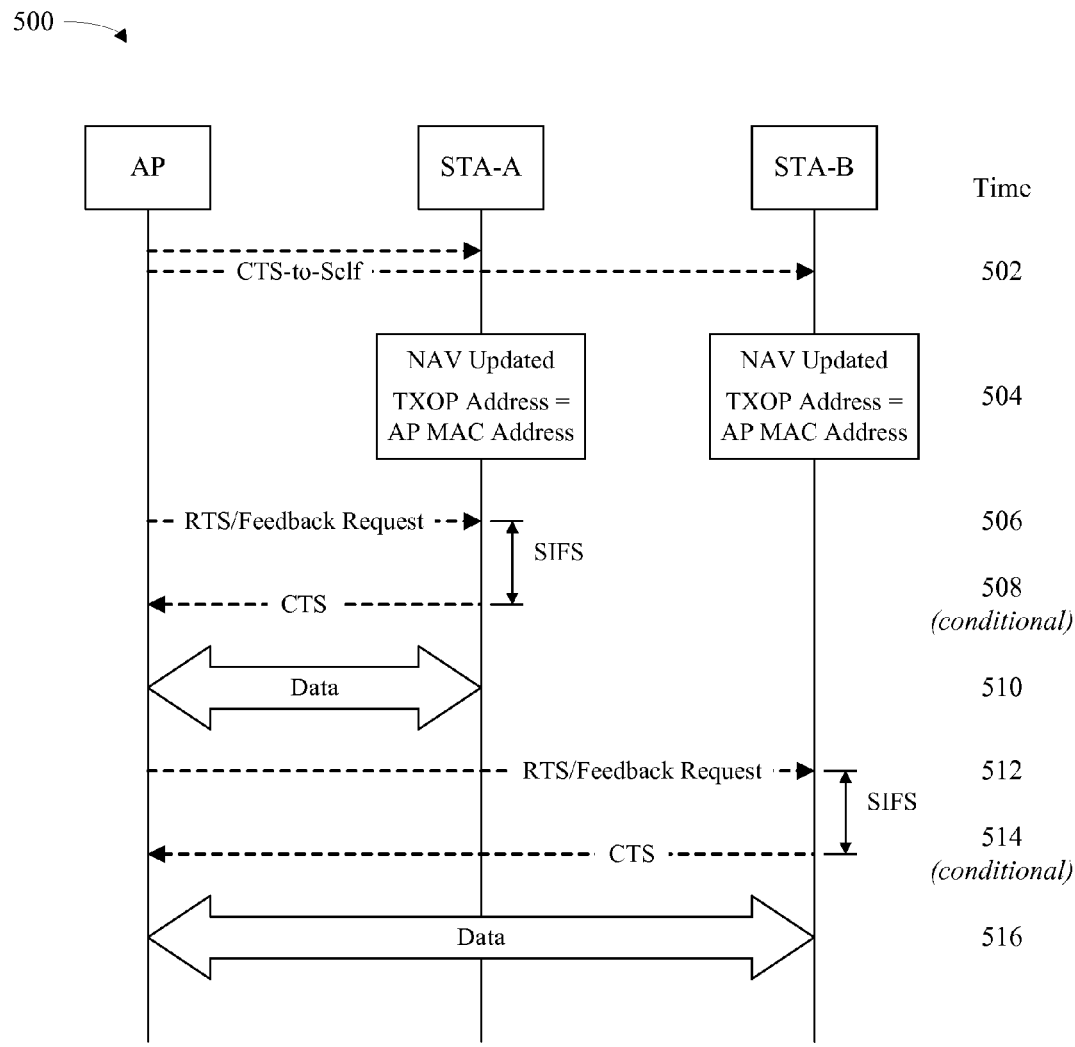
FIG. 5 is diagram that illustrates communication between an access point and multiple stations during a transmission opportunity in a wireless communication system.

FIG. 5 is diagram 500 that illustrates communication between an access point and multiple stations during a transmission opportunity in a wireless communication system. More particularly, diagram 500 illustrates an example usage scenario in which a CTS-to-self message is utilized by an access point (AP) for communication with two terminals, denoted in diagram 500 as STA-A and STA-B, during a TXOP in a system utilizing contention-based channel access. At time 502, AP wins the contention for channel access and establishes a TXOP by transmitting a CTS-to-self message to STA-A and STA-B. At time 504, STA-A and STA-B update their respective NAVs based on the CTS-to-self message transmitted at time 502 and store the MAC address of AP as the TXOP holder address.

At time 506, AP then sends an RTS message to STA-A with a sounding and rate feedback request. STA-A can then perform address matching between the TA address of the RTS message transmitted at time 506 and its stored TXOP holder address. If these addresses match, STA-A sends a CTS message back to AP at time 508 after SIFS time. The CTS message can include the sounding and rate feedback requested in the RTS message. Based on the RTS/CTS exchange at times 506-508, AP and STA-A can exchange data at time 510. Steering vectors and/or rate information derived from the RTS/CTS exchange at times 506-508 can be used in the data communication.

Next, at time 512, AP sends an RTS message to STA-B with a sounding and rate feedback request. STA-B can then compare the TA address of the RTS message and its stored TXOP holder address. If these addresses match, STA-B sends a CTS message back to AP at time 514 after SIFS time. The CTS message can include the sounding and rate feedback requested in the RTS message. Based on the RTS/CTS exchange at times 512-514, AP and STA-A can then exchange data at time 516. Steering vectors and/or rate information derived from the RTS/CTS exchange at times 512-514 can be used in the data communication.

Figure 6:
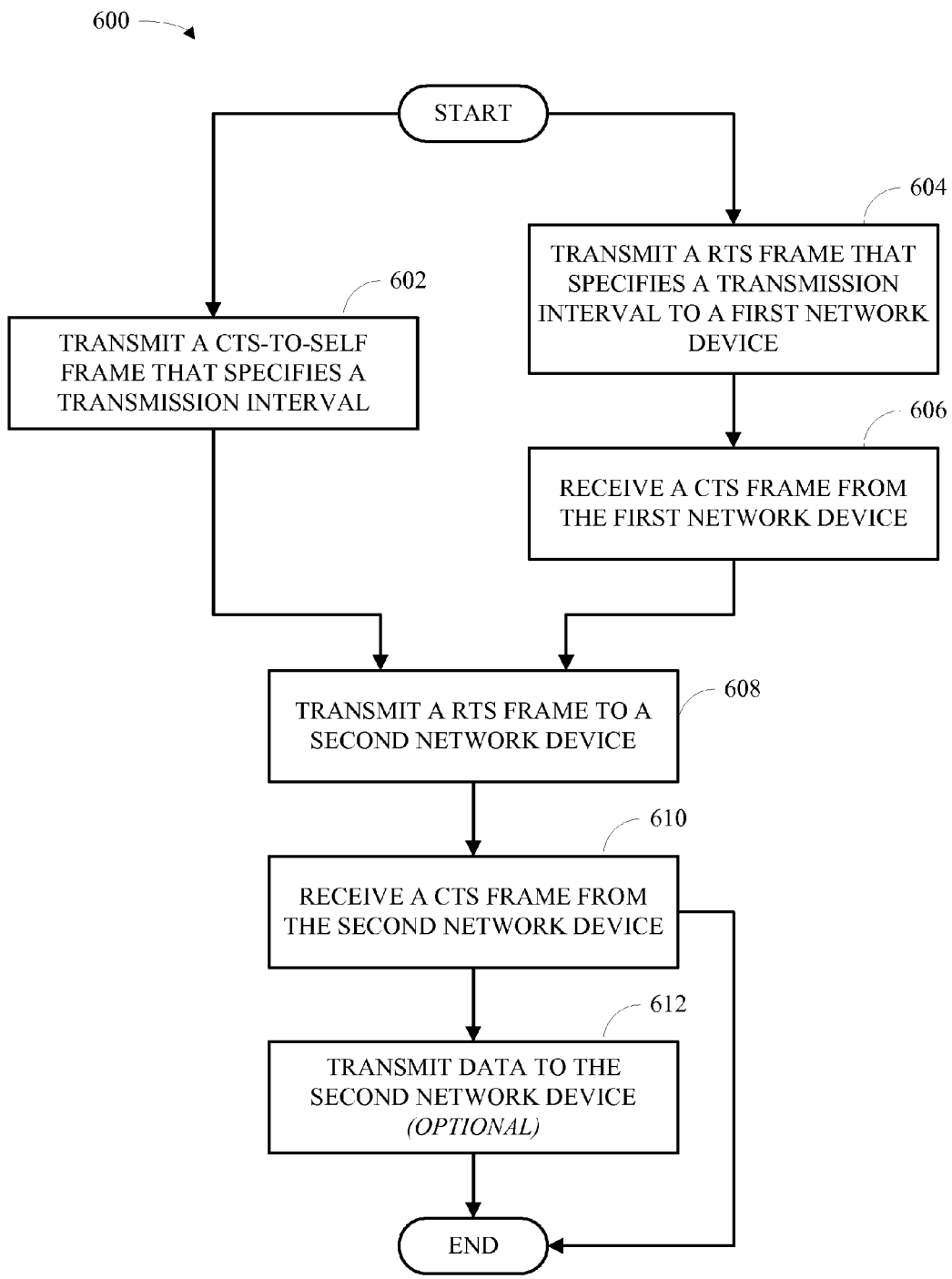
FIG. 6 is a flow diagram of a methodology for assigning multiple users for communication in a wireless communication system.

Referring to FIGS. 6-7, methodologies for conducting transmissions to multiple stations during a transmission opportunity are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is a methodology 600 for assigning multiple users (e.g., stations 112-116) for communication in a wireless communication system (e.g., system 100). It is to be appreciated that methodology 100 can be performed by, for example, an access point (e.g., access point 110), a station (e.g., a station 112, 114, and/or 116), and/or any other appropriate network entity.

In accordance with one aspect, methodology 600 begins by establishing a TXOP for communication with multiple users in a wireless communication system. As illustrated by FIG. 6, a TXOP can be established either as described at block 602 or as described at blocks 604-606. Accordingly, in one example methodology 600 can begin at block 602, wherein a CTS-to-self frame (e.g., a CTS-to-self frame 230) that specifies a desired transmission interval (e.g., TXOP duration 212). In one example, a CTS-to-self frame can be communicated at block 602 by transmitting a CTS frame that specifies the MAC address of an entity performing methodology 600 in both the transmitter address (TA) and recipient address (RA) fields of the CTS frame. By transmitting a CTS-to-self frame in this manner, the entity performing methodology 600 can unilaterally establish a TXOP within a system in which the entity operates. In another example, a desired transmission interval can be determined and embedded into the CTS-to-self frame in a similar manner to that described supra with regard to systems 200, 300. Additionally and/or alternatively, the CTS-to-self frame can specify multiple transmission classes, each of which can have their own transmission intervals. Based on specified interval(s) and/or other information embedded in the CTS-to-self frame transmitted at block 602, other entities in the system in which methodology 600 is performed can configure their respective NAVs (e.g., NAVs 222), TXOP holder addresses (e.g., TXOP holder addresses 224), and/or other appropriate properties to facilitate communication in the system using the TXOP.

Alternatively, methodology 600 can begin by establishing a TXOP as illustrated at block 604, wherein an RTS frame (e.g., RTS frame 330) that specifies a desired transmission interval is transmitted to a first network device, and at block 606, wherein a CTS frame is received in response from the first network device. In accordance with one aspect, the first network device can be configured to communicate using the TXOP based directly on the RTS/CTS exchange performed at blocks 604-606. In addition, other devices in the system can be configured to detect RTS frames communicated at block 604 and/or CTS frames communicated at block 606 and utilize information in the detected frame(s) for communication during the TXOP. In one example, a desired transmission interval can be determined and embedded into the RTS frame transmitted at block 604 in a similar manner to that described for the CTS-to-self frame at block 602. Alternatively, an RTS frame transmitted at block 604 can include a request for TXOP initialization without a transmission interval, and the transmission interval can be determined by the first network device and communicated back to the entity performing methodology 600 in a CTS frame at block 604. As another alternative, multiple transmission intervals can be specified at blocks 602-604 for respective transmission classes.

After TXOP initialization as illustrated at block 602 and/or blocks 604-606, a device performing methodology 600 can then utilize the newly established TXOP to communicate with one or more other devices. Accordingly, upon completing the acts described at block 602 and/or blocks 604-606, methodology 600 can proceed to block 608, wherein an RTS frame (e.g., an RTS frame 240 or 340) is transmitted to a second network device. It should be appreciated that, while blocks 604-606 refer to a "first network device" and block 608 refers to a "second network device," distinct network devices are not required and the communications at blocks 604-606 and block 608 can be conducted with the same network device. In one example, an RTS frame transmitted at block 608 can be used to initialize a subsequent communication of data to the second network device. For example, the RTS frame can include a request for sounding, rate feedback, and/or other feedback or information in order to allow the device performing methodology 600 to improve the quality of transmissions to the second device. By way of example, information received from the second network device in response to a request included in the RTS frame can enable the device performing methodology 600 to employ beamforming in transmitting data to the second network device.

After transmitting an RTS frame to the second network device as illustrated at block 608, a responsive CTS frame can be received from the second network device at block 610. In the event that the RTS frame transmitted at block 608 contains a request for information, the CTS frame received at block 610 can include the requested information. Once a RTS/CTS exchange as described at blocks 608-610 has successfully been performed, the device performing methodology 600 can then optionally transmit data to the second network device at block 612. In one example, any feedback or other information obtained from the second network device from the CTS frame received at block 610 and/or at any other suitable time can be utilized in carrying out the data transmission at block 612.

In accordance with one aspect, it should be appreciated that methodology 600 can be utilized for coordinating and conducting transmissions to a plurality of network devices using a single TXOP. Accordingly, it should be appreciated that once a TXOP has been established as illustrated at block and/or blocks 604-606, the acts described at blocks 608-612 can repeat for multiple network devices during the TXOP until the TXOP is reset or has expired.

Figure 7A:
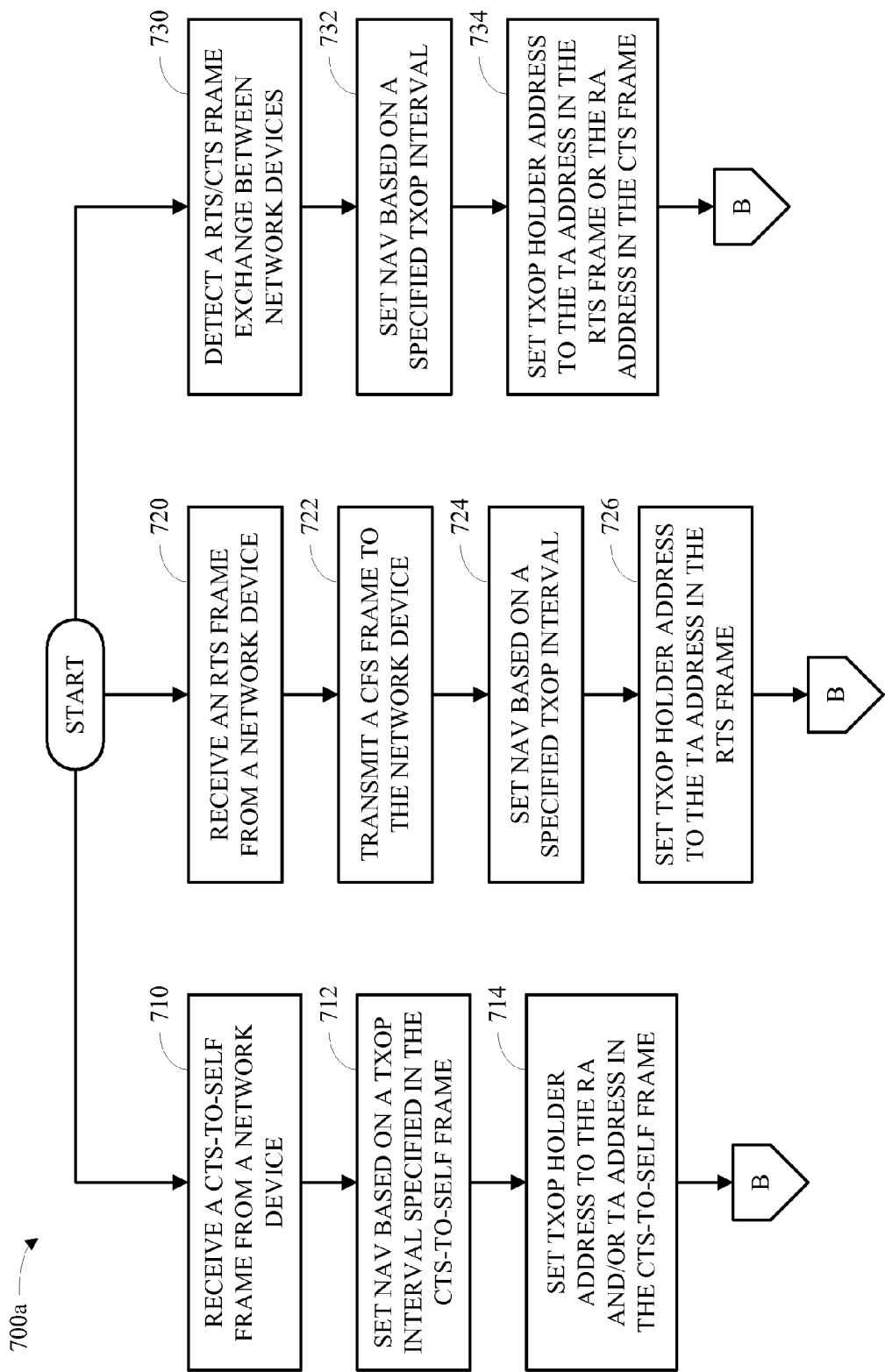
FIGS. 7A-7B comprise a flow diagram of a methodology for determining intervals associated with a transmission opportunity for communication in a wireless communication system.
Figure 7B:
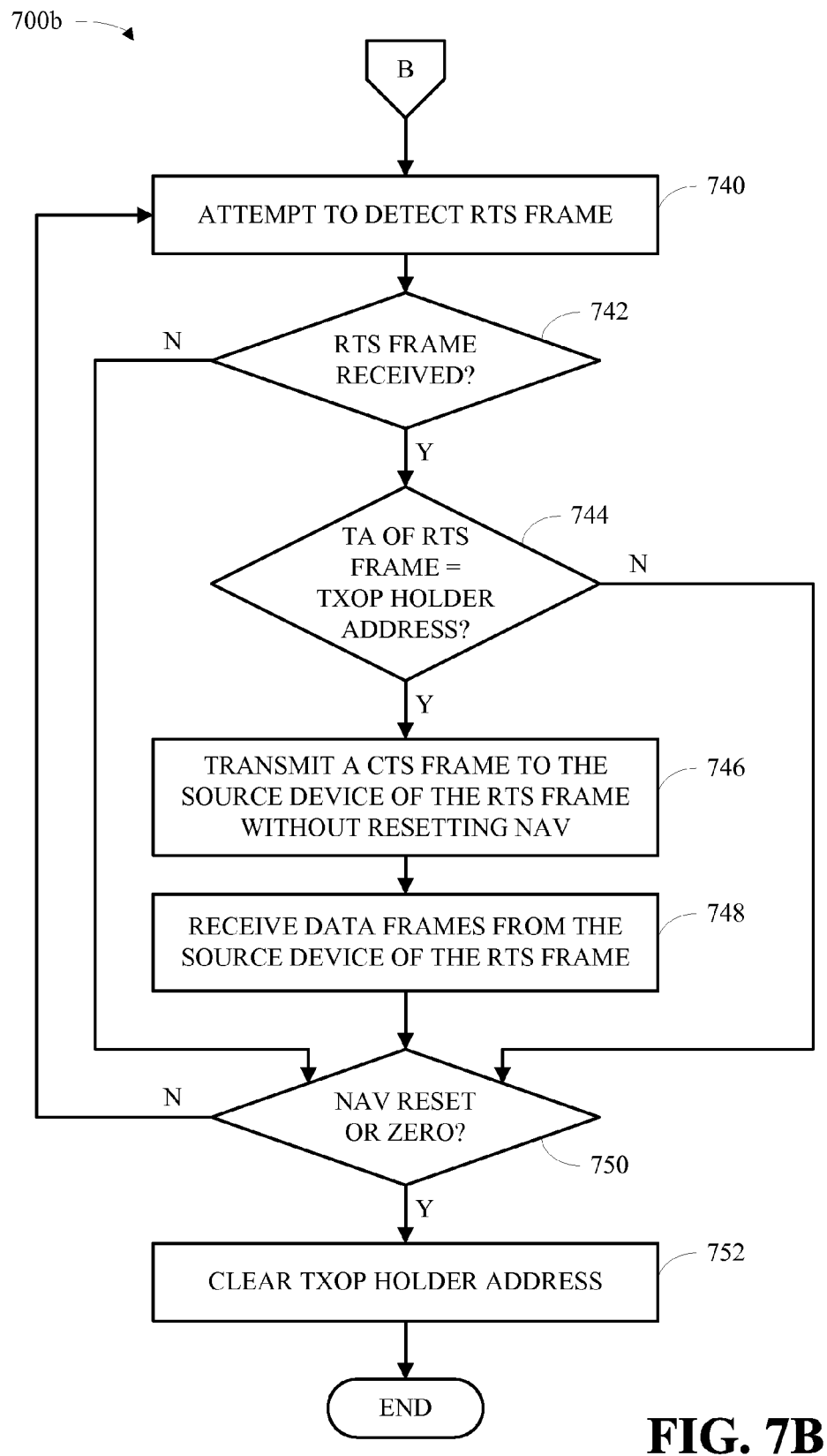

FIGS. 7A-7B illustrate a methodology 700 for determining intervals associated with a transmission opportunity for communication in a wireless communication system. It is to be appreciated that methodology 700 can be performed by, for example, an access point, a station, and/or any other appropriate entity in a wireless communication system. In accordance with one aspect, methodology 700 can begin by detecting that a TXOP has been established and determining a duration and TXOP holder address associated with the TXOP. To accomplish these ends, methodology 700 can begin in various manners. Accordingly, non-limiting examples of techniques that can be employed to begin methodology 700 are illustrated in FIG. 7A.

First, methodology 700 can begin as illustrated at block 710, wherein a CTS-to-self frame is received from a device in a network in which the entity performing methodology 700 operates. From this CTS-to-self frame, the entity performing methodology 700 can infer that a TXOP has been established. Further, the CTS-to-self frame received at block 710 can contain information relating to the TXOP, such as a TXOP interval specifying the duration of the TXOP for one or more transmission classes and/or the address of its holder. Next, at block 712, the entity performing methodology 700 can update its NAV based on a TXOP interval specified in the CTS-to-self frame. At block 714, the entity performing methodology 700 can then set the TXOP holder address based on the CTS-to-self frame received at block 710. In one example, a CTS-to-self frame can be sent by the TXOP holder and can identify the MAC address of the TXOP holder in both the RA and TA fields of the frame. As a result, the TXOP holder address can be set at block 714 as the MAC address provided in the RA and/or TA fields of the CTS-to-self frame. Upon completion of the act described at block 714, methodology 700 can then proceed to block 740 as illustrated in FIG. 7B.

As another example, methodology 700 can begin as illustrated at block 720, wherein an RTS frame is received from a network device. In one example, the RTS frame can be directed to the entity performing methodology 700, and as a result the entity performing methodology 700 can transmit a responsive CTS frame at block 722 to the device that transmitted the RTS frame at block 720. In one example, an entity performing methodology 700 can infer from the RTS frame received at block 720 that a TXOP has been established. As a result, the NAV of the entity can be set at block 724 based on a specified TXOP interval. In one example, the TXOP interval can be determined by the TXOP holder and specified in the RTS frame received at block 720. Alternatively, the TXOP interval can be determined by the entity performing methodology 700 and provided to the TXOP holder in the CTS frame transmitted at block 722. Next, at block 726, the TXOP holder address can be set to the MAC address of the device that transmitted the RTS frame at block 720 by, for example, identifying a MAC address provided in the TA field of the RTS frame. Upon completing the act described at block 726, the entity performing methodology 700 has successfully been configured for communication using the TXOP. Accordingly, methodology 700 can proceed to block 740 as illustrated in FIG. 7B.

As FIG. 7A additionally illustrates, methodology 700 can alternatively begin at block 730, wherein a RTS/CTS frame exchange between network devices is detected. In accordance with one aspect, a frame exchange can be detected at block 730 by detecting either an RTS frame or a CTS frame transmitted in response to the RTS frame. By detecting an RTS/CTS frame exchange as described at block 730, an entity performing methodology 700 can determine that such an exchange has been used to establish a TXOP within the system in which the entity performing methodology 700 operates even when neither the RTS frame nor the CTS frame are directed to that entity. Once the RTS/CTS frame exchange is detected at block 730, methodology 700 can continue to block 732, wherein the NAV of the entity performing methodology 700 is set based on a TXOP interval specified during the RTS/CTS frame exchange detected at block 730. Next, at block 734, the TXOP holder address is set based on the RTS/CTS frame exchange detected at block 730. As described with regard to blocks 720-726, a TXOP can be established when a TXOP holder transmits an RTS frame and receives a CTS frame from a network entity in return. Accordingly, the TXOP holder address can be set at block 734 using either the TA field of an RTS frame or the RA field of a CTS frame detected at block 730. Methodology 700 can then proceed to block 740 as illustrated in FIG. 7B.

As shown in FIG. 7B, upon completing the acts described at blocks 714, 726, or 734, methodology 700 can proceed to block 740 to attempt to detect an RTS frame. At block 742, it is then determined whether an RTS frame has been received. If it is determined that an RTS frame has not been received, methodology 700 can proceed to block 750 as will be discussed in more detail infra. In contrast, if it is determined that an RTS frame has not been received, methodology 700 can proceed to block 744, wherein the address of the entity that transmitted the RTS frame, as given by the TA field of the RTS frame, is compared to the TXOP holder address set at block 714, 726, or 734. If it is determined at block 744 that the TA field of the RTS frame matches the TXOP holder address, then the entity performing methodology 700 can infer that the TXOP holder has transmitted the RTS frame. Accordingly, methodology 700 can proceed to block 746, where a CTS frame is transmitted back to the device that sent the RTS frame (e.g., the TXOP holder) without resetting the NAV of the entity performing methodology 700. In one example, an RTS frame detected at blocks 742-744 can contain a request for feedback from the entity performing methodology 700. Thus, a CTS frame transmitted at block 746 in response to an RTS frame can include feedback requested in the RTS frame and/or other suitable feedback. Methodology 700 can then proceed to block 748, wherein data frames are received from the device that sent the RTS frame. It should be appreciated that any number of data frames or no data frames can be received at block 748. Further, if feedback is provided in a CTS frame transmitted at block 746, this feedback can be used for transmission of the data frames received at block 748.

Upon completing the act described at block 748, methodology 700 can proceed to block 750. In addition, upon a determination at block 744 that a received RTS frame was not sent by the TXOP holder, the RTS frame can be discarded and methodology 700 can proceed from block 744 to block 750. Methodology 700 can also proceed to block 750 from block 742 upon a determination that an RTS frame has not been received. At block 750, it is determined whether the NAV of the entity performing methodology 700 has been reset or is equal to zero. In accordance with one aspect, the NAV represents the duration of the TXOP established by the entity performing methodology 700; therefore, by determining whether the NAV has been reset or is equal to zero, the entity performing methodology 700 can effectively determine whether a present TXOP has reset or expired. Upon a positive determination at block 750, methodology 700 concludes at block 752, wherein the entity performing methodology 700 clears its stored TXOP holder address. Otherwise, methodology 700 can return to block 740 to attempt to detect an RTS frame.

Figure 8:
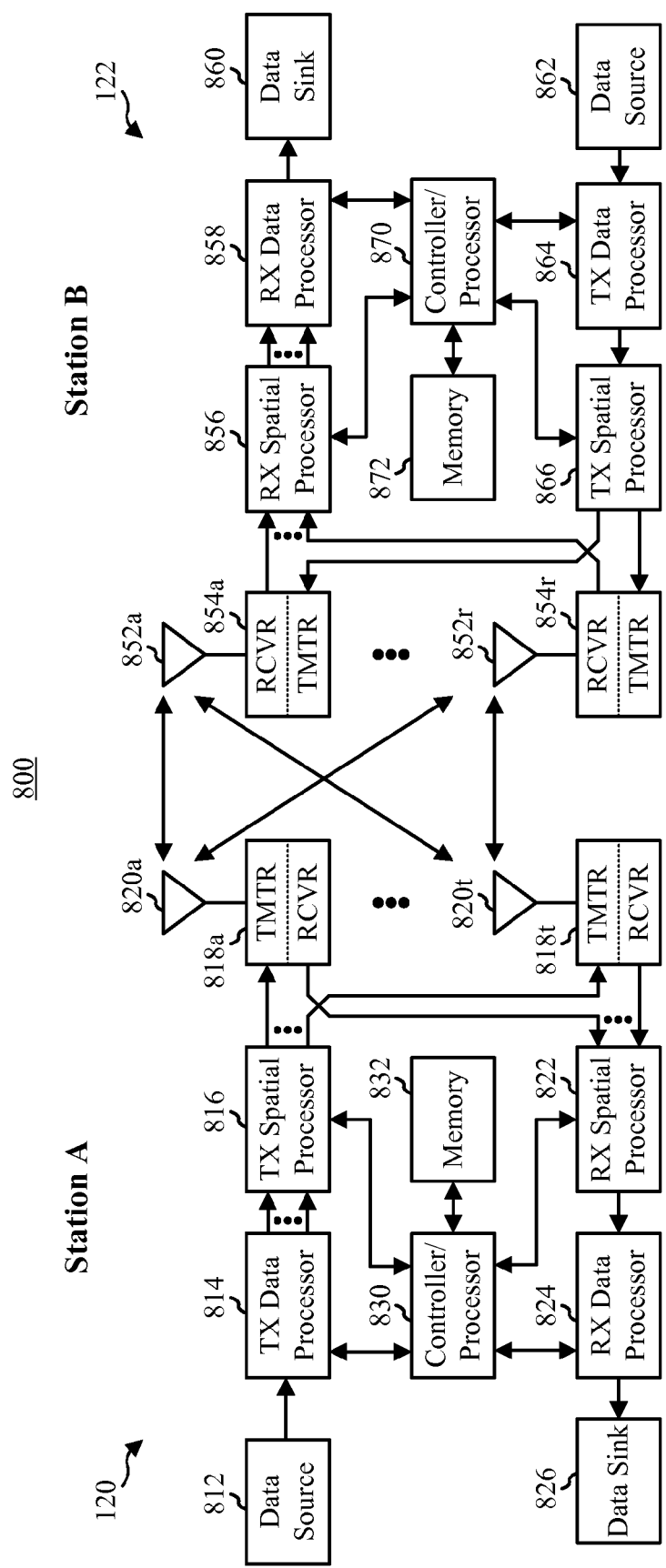
FIG. 8 is a block diagram illustrating an example wireless communication system in which various aspects described herein may function.

Referring now to FIG. 8, a block diagram illustrating an example wireless communication system 800 in which one or more embodiments described herein can function is provided. In one example, system 800 is a multiple-input multiple-output (MIMO) system that includes stations 120 and 122, wherein station 120 is equipped with multiple (T) antennas, and station 122 is equipped with multiple (R) antennas. It should be appreciated, however, that stations 120 and/or 122 could also be applied to a multi-input single-output system wherein, for example, multiple transmit antennas can transmit one or more symbol streams to a single antenna device. Additionally, it should be appreciated that aspects of stations 120 and/or 122 described herein could be utilized in connection with a single output to single input antenna system. Further, it should be appreciated that each antenna illustrated in system 800 can be a physical antenna or an antenna array.

In one example, a transmit (TX) data processor 814 at station 120 can receive traffic data from a data source 812 and/or other data from a controller/processor 830. In one example, TX data processor 814 can process (e.g., format, encode, interleave, and symbol map) the data and generate data symbols. A TX spatial processor 816 can multiplex pilot symbols with the data symbols, perform transmitter spatial processing on the multiplexed data symbols and pilot symbols, and provide up to T output symbol streams for up to T transceivers (TMTR) 818a through 818t. Each transceiver 818 can process (e.g., modulate, convert to analog, filter, amplify, and upconvert) an output symbol stream and generate a modulated signal. Up to T modulated signals from transceivers 818a through 818t can then be transmitted from antennas 120a through 120t, respectively.

In accordance with one aspect, R antennas 852a through 852r at station 122 can receive modulated signals from station 120. Each antenna 852 can then provide a received signal to a respective transceiver (RCVR) 854. Each transceiver 854 can process (e.g., filter, amplify, downconvert, digitize, and demodulate) a received signal and provide received symbols. A receive (RX) spatial processor 856 can then perform detection on the received symbols and provide data symbol estimates. An RX data processor 858 can further process (e.g., deinterleave and decode) the data symbol estimates and provide decoded data to a data sink 860.

In accordance with another aspect, transmission from station 122 to station 120 can also be conducted by first processing traffic data from a data source 862 and other data from a controller 870 at a TX data processor 864. The processed data can be multiplexed with pilot symbols, spatially processed by a TX spatial processor 866, and further processed by up to R transceivers 854a through 854r to generate up to R modulated signals that can be transmitted via antennas 852a through 852r. At station 120, the modulated signals from station 122 can be received by T antennas 120a through 120t, processed by up to T transceivers 818a through 818t, spatially processed by an RX spatial processor 822, and further processed by an RX data processor 824 to recover the data sent by station 122. Recovered data can then be provided to a data sink 826.

In one example, controller/processor 830 at station 120 and controller/processor 870 at station 122 direct operation at their respective systems. Additionally, memory 832 at station 122 and memory 872 at station 122 can provide storage for program codes and data used by controller/processors 830 and 870, respectively.

Figure 9:
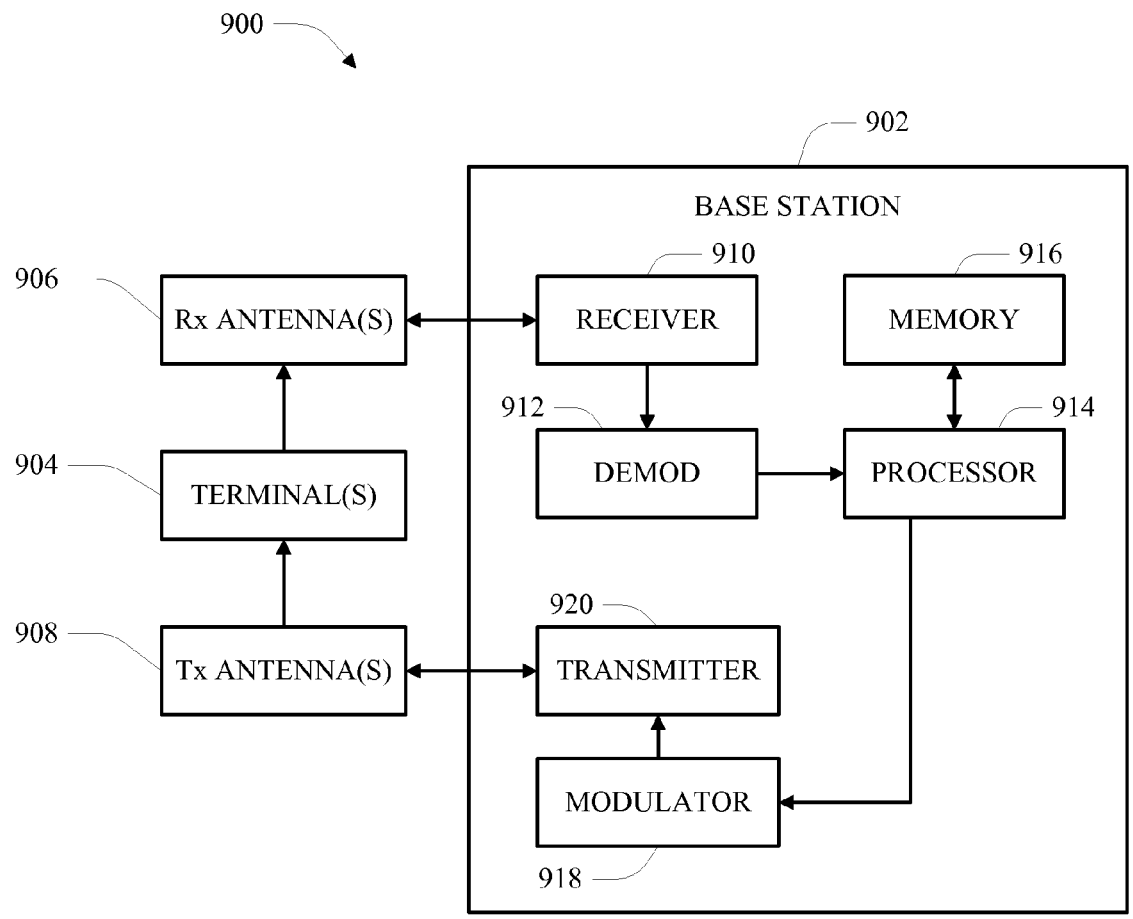
FIG. 9 is a block diagram of a system that coordinates communication with multiple terminals during a transmission opportunity in accordance with various aspects.

FIG. 9 is a block diagram of a system 900 that coordinates communication with multiple terminals 904 during a transmission opportunity in accordance with various aspects described herein. In one example, system 900 includes a base station or access point 902. As illustrated, access point 902 can receive signal(s) from one or more access terminals 904 via one or more receive (Rx) antennas 906 and transmit to the one or more access terminals 904 via one or more transmit (Tx) antennas 908. Additionally, access point 902 can comprise a receiver 910 that receives information from receive antenna(s) 906. In one example, the receiver 910 can be operatively associated with a demodulator (Demod) 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. In one example, access point 902 can employ processor 914 to perform methodologies 600, 700, and/or other appropriate methodologies. Access point 902 can also include a modulator 918 that can multiplex a signal for transmission by a transmitter 920 through transmit antenna(s) 908 to one or more access terminals 904.

Figure 10:
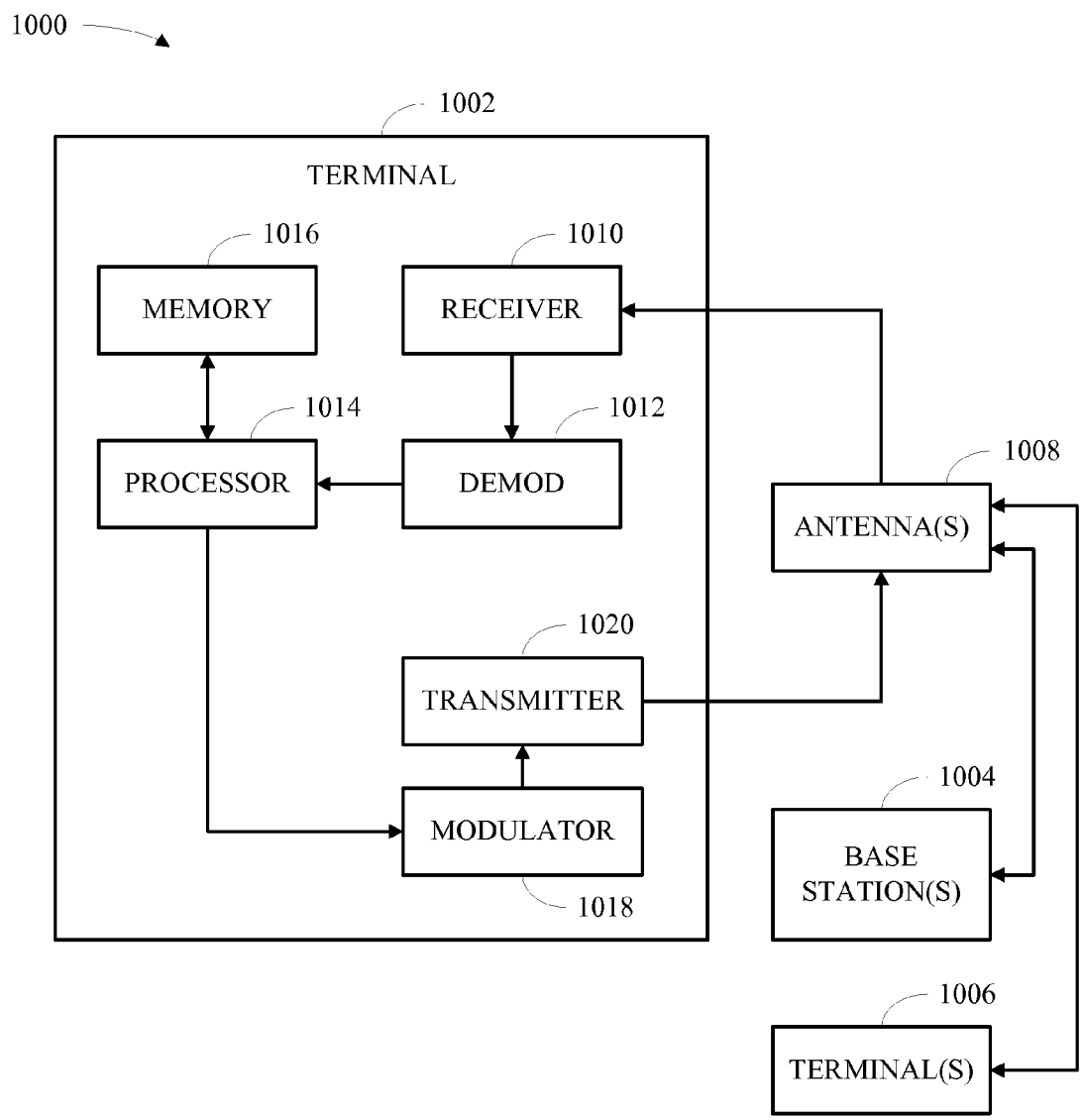
FIG. 10 is a block diagram of a system that facilitates communication with one or more base stations and/or terminals during a transmission opportunity in accordance with various aspects.

FIG. 10 is a block diagram of a system 1000 that facilitates communication with one or more base stations 1008 and/or terminals 1006 during a transmission opportunity in accordance with various aspects. In one example, system 1000 includes a terminal or station 1002. As illustrated, terminal 1002 can receive signal(s) from one or more access points 1004 and/or terminals 1006 and transmit to the one or more access points 1004 and/or terminals 1006 via antenna(s) 1008. Additionally, terminal 1002 can comprise a receiver 1010 that receives information from antenna(s) 1008. In one example, receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to terminal 1002. Additionally, terminal 1002 can employ processor 1014 to perform methodologies 600, 700, and/or other appropriate methodologies. Terminal 1002 can also include a modulator 1018 that can multiplex a signal for transmission by a transmitter 1020 via antenna(s) 1008 to one or more access points 1004 and/or terminals 1006.

Figure 11:
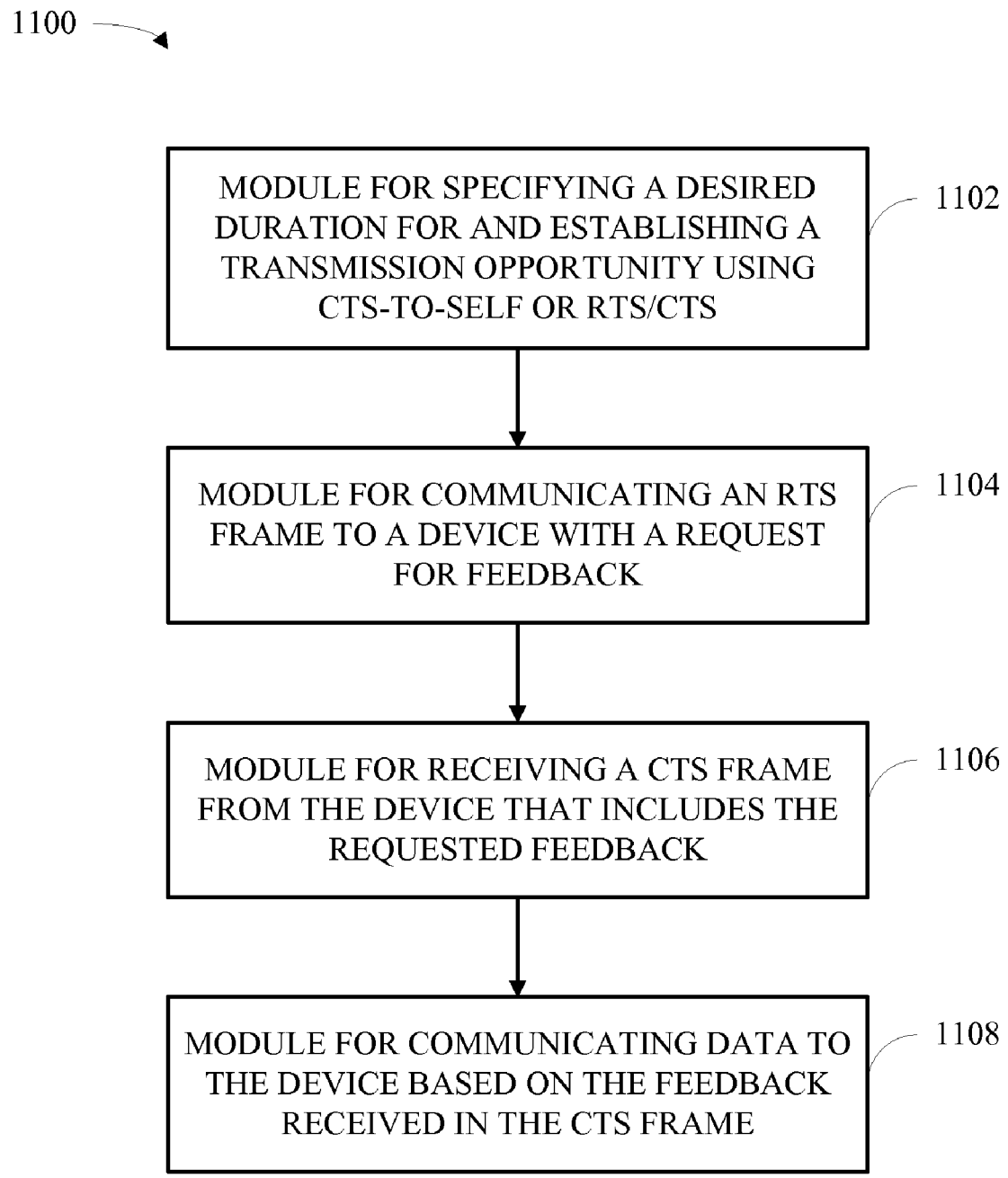
FIG. 11 is a block diagram of an apparatus that facilitates initiation of a transmission opportunity and communication with multiple devices during the transmission opportunity.

FIG. 11 illustrates an apparatus 1100 that facilitates initiation of a transmission opportunity and communication with multiple devices (e.g., access point 110 and/or stations 112-116 in network 100) during the transmission opportunity. It is to be appreciated that apparatus 1100 is represented as including functional blocks, which can be functional blocks that represent functions implemented by a processor, software, or combination thereof (e.g., firmware). Apparatus 1100 can be implemented in an access point (e.g., access point 110), a user station (e.g., stations 112-116), and/or another suitable network entity and can include a module 1102 for specifying a desired duration for and establishing a transmission opportunity using a CTS-to-self frame or an RTS/CTS exchange, a module 1104 for communicating an RTS frame to a device with a request for feedback, a module 1106 for receiving a CTS frame from the device that includes the requested feedback, and a module 1108 for communicating data to the device based on the feedback received in the CTS frame.

Figure 12:
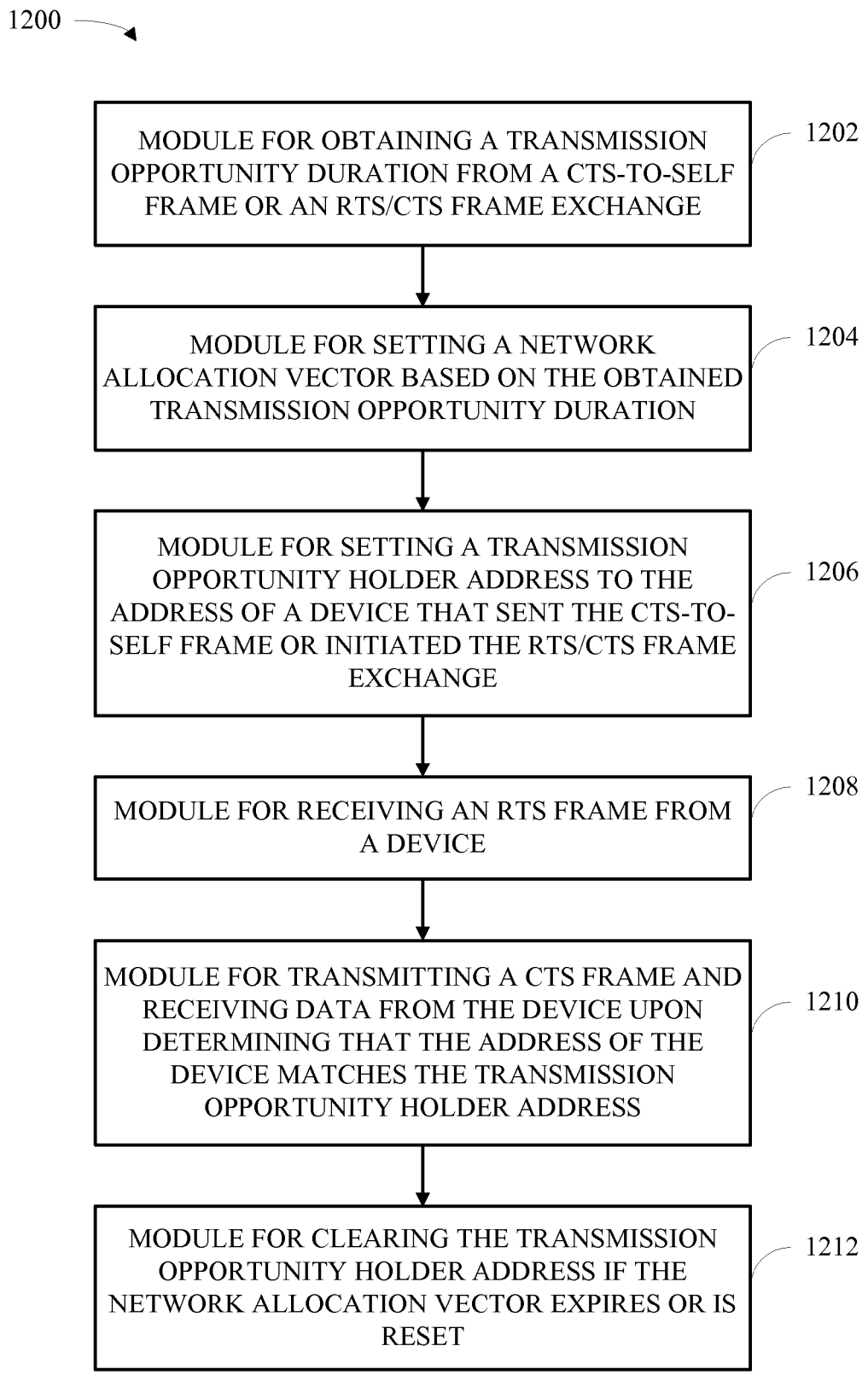
FIG. 12 is a block diagram of an apparatus that facilitates determining communication intervals associated with a transmission opportunity and communicating with the holder of the transmission opportunity.

FIG. 12 illustrates an apparatus 1200 that facilitates determining communication intervals associated with a transmission opportunity and communicating with the holder of the transmission opportunity. It is to be appreciated that apparatus 1200 is represented as including functional blocks, which can be functional blocks that represent functions implemented by a processor, software, or combination thereof (e.g., firmware). Apparatus 1200 can be implemented in an access point, a user station, and/or another suitable network entity and can include a module 1202 for obtaining a transmission opportunity duration from a CTS-to-self frame or an RTS/CTS frame exchange, a module 1204 for setting a network allocation vector based on the obtained transmission opportunity duration, a module 1206 for setting a transmission opportunity holder address to an address of a device that sent the CTS-to-self frame or initiated the RTS/CTS frame exchange, a module 1208 for receiving an RTS frame from a device, a module 1210 for transmitting a CTS frame and receiving data from the device upon determining that the address of the device matches the transmission opportunity holder address, and a module 1212 for clearing the transmission opportunity holder address if the network allocation vector expires or is reset.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for coordinating and conducting transmissions to a plurality of users during a transmission opportunity, comprising:
   transmitting, to a first user aid to a second user, a clear-to-send-to-self frame, wherein the clear-to-send-to-self frame establishes a transmitter as a holder of a transmission opportunity and comprises an address of the transmitter and a transmission interval, wherein the clear-to-send-to-self frame includes the address of the transmitter in a transmitter address field of the clear-to-send-to-self frame and in a recipient address field of the clear-to-send-to-self frame;
   transmitting a first request-to-send frame to the first user during the transmission interval, wherein the first request-to-send frame indicates the address of the transmitter and an address of the first user, wherein the first request-to-send frame comprises a request for channel information feedback from the first user;
   receiving a clear-to-send frame from the first user responsive to the first request-to-send frame;
   transmitting data to the first user;
   transmitting a second request-to-send frame to the second user during the transmission interval, wherein the second request-to-send frame indicates the address of the transmitter and an address of the second user, wherein the second request-to-send frame comprises a request for channel information feedback from the second user;
   receiving a clear-to-send frame from the second user responsive to the second request-to-send frame; and
   transmitting data to the second user.

2. The method of claim 1, wherein the transmitting the clear-to-send-to-self frame comprises:
   transmitting a request-to-send frame to the first user and the second user that includes the address of the transmitter as a source of the request-to-send frame and an address of the user as a receiver of the request-to-send frame; and
   receiving a clear-to-send-frame from the first user responsive to the request-to-send frame.

3. The method of claim 2, wherein the first request-to-send frame includes a request for a transmission interval and the clear-to-send frame received from the user it response to the first request-to-send frame indicates a transmission interval.

4. The method of claim 1, further comprising determining the transmission interval by determining a length of time required for transmission of the data to the first user and the second user.

5. The method of claim 1, further comprising determining the transmission interval by determining an allowable transmission interval length for one or more transmission classes to be used for transmitting the data to the first user and the second user.

6. The method of claim 1, wherein the respective clear-to-send frames received from the first user and the second user responsive to the first request-to-send frame and the second request-to-send frame include channel information feedback indicated by the respective requests for channel information feedback.

7. The method of claim 6, wherein the data is respectively transmitted to the first user and the second user, using the channel information feedback included in the clear-to-send frames respectively received by the first user and the second user.

8. The method of claim 6, further comprising:
   applying beamforming to the data to be transmitted to the first user based at least in part on the channel information feedback included in the clear-to-send frame received from the first user; and
   applying beamforming to the data to be transmitted to the second user based at least in part on the channel information feedback included in the clear-to-send frame received from the second user.

9. A wireless communications apparatus, comprising
   a memory that stores data relating to an address of the wireless communications apparatus and a transmission opportunity (TXOP) duration; and
   a processor configured to
      transmit, to a first station and to a second station, a clear-to-send-to-self frame, the clear-to-send-to-self frame establishes the wireless communications apparatus as a holder of a transmission opportunity and comprises the wireless communications apparatus and the TXOP duration, wherein the clear-to-send-to-self frame includes the address of the wireless communication apparatus in a transmitter address field of the clear-to-send-to-self frame and in a recipient address field of the clear-to-send-to-self frame;
      transmit a first request-to-send frame to the first station during the TXOP duration, the first request-to-send frame indicates the address of the wireless communications apparatus and an address of the first user, wherein the first request-to-send frame comprises a request for channel information feedback from the first user;
      receive a first clear-to-send frame from the first station responsive to the first request-to-send frame;
      transmit data to the first station;
      transmit a second request-to-send frame to the second station during the TXOP duration, the second request-to-send frame indicates the address of wireless communications apparatus and an address of the second user, wherein the second request-to-send frame comprises a request for channel information feedback from the second user;
      receive a second clear-to-send frame from the second station responsive to the second request-to-send frame; and
      transmit data to the second station.

10. The wireless communications apparatus of claim 9, wherein the processor is configured to transmit the first request-to-send frame comprising the address of the wireless communications apparatus and the TXOP duration to the first station and to receive the first clear-to-send frame from the first station responsive to the request-to-send frame.

11. The wireless communications apparatus of claim 9, wherein the processor is configured to transmit the first request-to-send frame comprising the address of the wireless communications apparatus to the first station and to receive the first clear-to-send message that comprises the TXOP duration from the first station responsive to the request-to-send frame.

12. The wireless communications apparatus of claim 9, wherein the processor is further configured to determine the TXOP duration as a length of time required for transmission of data to the first station and the second station.

13. The wireless communications apparatus of claim 9, wherein the processor is further configured to determine, the TXOP duration as an allowable transmission interval length for one or more transmission classes to be used for transmitting data to the first station and the second station.

14. The wireless communications apparatus of claim 9, wherein the processor is further configured to identify channel information feedback in the first clear-to-send frame and the second clear-to-send frame received from the first station and the second station in response to the requests for channel information feedback embedded in the first request-to-send frame and the second request-to-send frame.

15. The wireless communications apparatus of claim 14, wherein the processor is further configured to transmit data to the first station and the second station using the channel information feedback identified in the first clear-to-send frame and the second clear-to-send frame.

16. The wireless communications apparatus of claim 14, wherein the processor is further configured to transmit data to the first station and the second station by beamforming signals containing the data based at least in part on the channel information feedback included in the first clear-to-send frame and the second clear-to-send frame.

17. The wireless communications apparatus of claim 9, wherein one of the first station or the second station comprise a wireless access point.

18. The wireless communications apparatus of claim 9, wherein one of the first station or the second station comprise at least one wireless terminal and the processor is configured to transmit data to the terminal using direct link setup (DLS).

19. A method for initiating and conducting communication in a wireless communication system, comprising:
   detecting one or more clear-to-send frames or request-to-send frames, the one or more frames indicate an address of an entity that holds a transmission opportunity and a duration of the transmission opportunity;
   setting a network allocation vector (NAV) based on the duration of the transmission opportunity;
   receiving a request-to-send frame that indicates an address of an entity that transmitted the request-to-send frame, wherein the request-to-send frame comprises a request for channel information feedback;
   determining if the address of the entity that transmitted the request-to-send frame is the same as the address of the entity that holds the transmission opportunity; and
   if the addresses are the same, transmitting a clear-to-send frame to the entity that transmitted the request-to-send frame, the clear-to-send frame includes the requested channel information feedback.

20. The method of claim 19, wherein the detecting one or more clear-to-send frames or request-to-send frames comprises detecting a clear-to-send frame that indicates the address of the entity that holds the transmission opportunity as an addressee of the clear-to-send frame.

21. The method of claim 19, wherein the detecting one or more clear-to-send frames or request-to-send frames comprises:
   detecting a request-to-send frame that indicates the address of the entity that holds the transmission opportunity as a transmitter of the request-to-send frame; and
   transmitting a clear-to-send frame to the entity that holds the transmission opportunity in response to the request-to-send frame.

22. The method of claim 19, wherein the detecting one or more clear-to-send frames or request-to-send frames comprises detecting one or more of a request-to-send frame transmitted from the entity that holds the transmission opportunity to a target station and a clear-to-send frame transmitted from the target station to the entity that holds the transmission opportunity.

23. The method of claim 19, further comprising preventing updating the NAV if the address of the entity that transmitted the request-to-send, frame is the same as the address of the entity that holds the transmission opportunity.

24. The method of claim 19, wherein the transmitting a clear-to-send frame comprises transmitting the clear-to-send frame approximately after a short interframe spacing (SIFS) period.

25. The method of claim 19, further comprising receiving data from the entity that holds the transmission opportunity.

26. The method of claim 19, wherein the receiving a request-to-send frame comprises;
   determining whether the NAV has been reset or has expired; and
   if the NAV has been reset or has expired, discarding the request-to-send frame.

27. A wireless-communications apparatus; comprising
   a memory that stores data relating to a NA and an address of a transmitter; and
   a processor configured to
   detect one or more initial messages that indicate the address of the transmitter, one or more transmission classes to be utilized by the transmitter, and transmission intervals respectively corresponding to the transmission classes;
   set the NAV based on the transmission intervals;
   receive a subsequent request-to-send message; compare a source address of the subsequent request-to-send message with the address of the transmitter, wherein the request-to-send message comprises a request for channel information feedback; and
   transmit a clear-to-send message to the transmitter upon determining that the source address of the subsequent request-to-send message is the same as the address of the transmitter, the clear-to-send frame includes the requested channel information feedback.

28. The wireless communications apparatus of claim 27, wherein the processor is further configured to detect one or more initial messages that comprise a clear-to-send message that indicates the address of the transmitter as an addressee of the clear-to-send message.

29. The wireless communications apparatus of claim 27, wherein the memory further stores data relating to an address of the wireless communications apparatus, and the processor is further configured to detect one or more initial messages that comprise a request-to-send frame that indicates the address of the transmitter as a source of the request-to-send message and the address of the wireless communications apparatus as the addressee of the request-to-send message.

30. The wireless communications apparatus of claim 29, wherein the processor is further configured to transmit a clear-to-send, message to the transmitter in response to the request-to-send message.

31. The wireless communications apparatus of claim 30, wherein the memory further stores data relating to one or more transmission intervals and the processor is further configured to communicate the transmission intervals to the transmitter in the clear-to-send message.

32. The wireless communications apparatus of claim 27, wherein the processor is further configured to detect one or more initial messages that comprise at least one of a request-to-send message transmitted from the transmitter to an entity other than the wireless communications apparatus or a clear-to-send message transmitted from the entity other that the wireless communications apparatus to the transmitter.

33. The wireless communications apparatus of claim 27, wherein the processor is further configured to abstain from updating the NAV upon receiving a subsequent request-to-send message from the transmitter.

34. The wireless communications apparatus of claim 27, wherein the processor is further configured to transmit the clear-to-send message approximately after a short interframe spacing (SIFS) period upon receiving the subsequent request-to-send message.

35. The wireless communications apparatus of claim 27, wherein the processor is further configured to receive data from the transmitter upon transmitting the clear-to-send message to the transmitter.

36. The wireless communications apparatus of claim 27, wherein the processor is further configured to determine whether the NAV has been reset or has expired and to discard a subsequent request-to-send message upon a positive determination.

37. An apparatus comprising:
   means for transmitting, to a first user and to a second user, a clear-to-send-to-self frame, the clear-to-send-to-self frame establishes a transmitter as a holder of a transmission opportunity and comprises al address of the transmitter and a transmission interval, wherein the clear-to-send-to-self frame includes the address of the transmitter in a transmitter address field and in a recipient address field of the clear-to-send-to-self frame;
   means for transmitting a first request-to-send frame to the first user during the transmission interval, the first request-to-send frame indicates the address of the transmitter and an address of the first user, wherein the first request-to-send frame comprises a request for channel information feedback from the first user;
   means for receiving a clear-to-send frame from the first user responsive to the first request-to-send frame;
   means for transmitting data to the first user;
   means for transmitting a second request-to-send frame to the second user during the transmission interval, the second request-to-send frame indicates the address of the transmitter and an address of the second user, wherein the second request-to-send frame comprises a request for channel information feedback from the second user;
   means for receiving a clear-to-send frame from the second user responsive to the second request-to-send frame; and
   means for transmitting data to the second user.

38. A non-transitory, computer-readable storage medium tangibly storing one or more instructions, which when executed by one or more processors cause the one or more processors to:
   transmit, to a first user and to a second user, a clear-to-send-to-send frame, the clear-to-send-to-self frame establishes a transmitter as a holder of a transmission opportunity and comprises an address of the transmitter and a transmission interval, wherein the clear-to-send-to-self frame includes the address of the transmitter in a transmitter address field and in a recipient address field of the clear-to-send-send-to-self frame;
   transmit a first request-to-send frame to the first user during the transmission interval, wherein the first request-to-send frame indicates the address of the transmitter and an address of the first user, wherein the first request-to-send frame comprises a request for channel information feedback from the first user;
   receive a clear-to-send frame from the first user responsive to the request-to-send frame; transit data to the first user;
   transmit a second request-to-send frame to the second user during the transmission interval, wherein the second request-to-send frame indicates the address of the transmitter and an address of the second user, wherein the second request-to-send frame comprises a request for channel information feedback from the second user;
   receive a clear-to-send frame from the second user responsive to the second request-to-send frame; and
   transmit data to the second user.

39. An integrated circuit that executes computer-executable instructions for communicating in a wireless communication system during a transmission opportunity, the instructions causing:
   transmitting, to a first user and to a second user, a clear-to-send-to-self frame, the clear-to-send-to-self frame establishes a transmitter as a holder of a transmission opportunity and comprises an address of the transmitter and a transmission interval, wherein the clear-to-send-to-self frame includes the address of the transmitter in a transmitter address field and in a recipient address field of the clear-to-send-to-self frame;
   transmitting a first request-to-send frame to the first user during the transmission interval, wherein the first request-to-send frame indicates the address of the transmitter and an address of the first user, wherein the first request-to-send frame comprises a request for channel information feedback from the first user;
   receiving a clear-to-send frame from the first user responsive to the first request-to-send frame;
   transmitting data to the first user;
   transmitting a second request-to-send frame to the second user during the transmission interval, wherein the second request-to-send frame indicates the address of the transmitter and an address of the second user, wherein the second request-to-send frame comprises a request for channel information feedback from the second user;
   receiving a clear-to-send frame from the second user responsive to the second request-to-send frame; and
   transmitting data to the second user.

40. An apparatus comprising:
   means for defecting one or more clear-to-send frames or request-to-send frames, the one or more frames indicate ant address of an entity that holds a transmission opportunity and a duration of the transmission opportunity;
   means for setting a network allocation vector (NAV) based on the duration of the transmission opportunity;

means for receiving a request-to-send frame that indicates an address of an entity that transmitted the request-to-send frame, wherein the request-to-send frame comprises a request for channel information feedback;

means for determining if the address of the entity that transmitted the request-to-send frame is the same as the address of the entity that holds the transmission opportunity; and means for transmitting, if the addresses are the same, a clear-to-send frame to the entity that transmitted the request-to-send frame, the clear-to-send frame includes the requested channel information feedback.

41. A non-transitory, computer-readable storage medium tangibly storing one or more instructions, which when executed by one or more processors cause the one or more processors to:

detect one or more clear-to-send frames or request-to-send frames, the one or more frames indicate an address of an entity that holds a transmission opportunity and a duration of the transmission opportunity;

set a network allocation vector (NAV) based on the duration of the transmission opportunity;

receive a request-to-send frame that indicates an address of an entity that transmitted the request-to-send frame, wherein the request-to-send frame comprises a request for channel information feedback;

determine if the address of the entity that transmitted the request-to-send frame is the same as the address of the entity that holds the transmission opportunity; and if the addresses are the same, transmit a clear-to-send frame to the entity that transmitted the request-to-send frame, the clear-to-send frame includes the requested channel information feedback.

42. An integrated circuit that executes computer-executable instructions for communicating in a wireless communication system during a transmission opportunity, the instructions causing;

defecting one or more clear-to-send frames or request-to-send frames, the one or more frames indicate an address of an entity that holds a transmission opportunity and a duration of the transmission opportunity;

setting a network allocation vector (NAV) based on the duration of the transmission opportunity;

receiving a request-to-send frame that indicates an address of an entity that transmitted the request-to-send frame, wherein the request-to-send frame comprises a request for channel information feedback;

determining if the address of the entity that transmitted the request-to-send frame is the same as the address of the entity that holds the transmission opportunity; and if the addresses are the same, transmitting a clear-to-send frame to the entity that transmitted the request-to-send frame, the clear-to-send frame includes the requested channel information feedback.

* * * * *